(12) United States Patent
Kuno

(10) Patent No.: US 7,528,992 B2
(45) Date of Patent: May 5, 2009

(54) IMAGE PROCESSING DEVICE AND IMAGE PROCESSING METHOD

(75) Inventor: Masashi Kuno, Ohbu (JP)

(73) Assignee: Brother Kogyo Kabushiki Kaisha, Nagoya (JP)

(*) Notice: Subject to any disclaimer, the term of this patent is extended or adjusted under 35 U.S.C. 154(b) by 907 days.

(21) Appl. No.: 10/937,488

(22) Filed: Sep. 10, 2004

(65) Prior Publication Data
US 2005/0030587 A1    Feb. 10, 2005

Related U.S. Application Data

(63) Continuation-in-part of application No. 10/244,382, filed on Sep. 17, 2002, now Pat. No. 7,298,525.

(30) Foreign Application Priority Data

Sep. 18, 2001  (JP) ............... 2001-282601
Sep. 12, 2003  (JP) ............... 2003-320772

(51) Int. Cl.
  *H04N 1/40*   (2006.01)
  *G06K 15/00*  (2006.01)

(52) U.S. Cl. ............... 358/3.02; 358/3.05; 358/3.06; 358/3.21; 358/3.27

(58) Field of Classification Search ............... 358/1.8, 358/3.01, 3.02, 3.03, 3.04, 3.05, 3.06, 3.14, 358/3.21, 3.24, 462, 3.27
See application file for complete search history.

(56) References Cited

U.S. PATENT DOCUMENTS

| | | | | |
|---|---|---|---|---|
| 5,530,561 A | * | 6/1996 | Shimazaki | 358/3.03 |
| 6,310,588 B1 | * | 10/2001 | Kawahara et al. | 345/63 |
| 6,943,918 B1 | * | 9/2005 | Kakutani | 358/3.02 |
| 7,298,525 B2 | * | 11/2007 | Hagai et al. | 358/1.9 |
| 2001/0028468 A1 | | 10/2001 | Yamamoto | |
| 2003/0053098 A1 | | 3/2003 | Hagai et al. | |

FOREIGN PATENT DOCUMENTS

| JP | 9-98290 | 4/1997 |
|---|---|---|
| JP | 9-107472 | 4/1997 |

(Continued)

*Primary Examiner*—James A Thompson
(74) *Attorney, Agent, or Firm*—Oliff and Berridge, PLC

(57) ABSTRACT

If a false edge will possibly occur at a portion in an image where the input pixel value. Iin is equal to the value $(R_j+F)$, where $j=N, S, M,$ or $L$, the noise value N is generated when the input pixel value Iin is around the value $(R_j+F)$. The noise value N has a value equal to a product of a random number, the value "rate", and the value "coefficient". The value "rate" becomes the maximum value (1) when the input pixel value Iin is equal to the value $(R_j+F)$, and becomes zero (0) when the input pixel value Iin is smaller than or equal to the value $(R_j+F)$–Range and when the input pixel value Iin is greater than or equal to the value $(R_j+F)$+Range. The value "coefficient" ensures that the value (Iin+N) will not become smaller than an input minimum value Imin or a threshold that corresponds to another relative value that is smaller than and next to the subject relative value $R_j$ and will not exceed the input maximum value Imax or another threshold that corresponds to still another relative value that is greater than and next to the subject relative value $R_j$.

37 Claims, 11 Drawing Sheets

FOREIGN PATENT DOCUMENTS

| | | |
|---|---|---|
| JP | 11-239273 | 8/1999 |
| JP | 11-261819 | 9/1999 |
| JP | 2000-22951 | 1/2000 |
| JP | 2000-244737 | 9/2000 |
| JP | 2001-144961 | 5/2001 |
| JP | 2001-285634 | 10/2001 |
| JP | 2003-92689 | 3/2003 |

* cited by examiner

| 1/48 | 3/48 | 5/48 | 3/48 | 1/48 |
|------|------|------|------|------|
| 3/48 | 5/48 | 7/48 | 5/48 | 3/48 |
| 5/48 | 7/48 | (X, Y) | | |

| | CYAN | MAGENTA | YELLOW | BLACK |
|---|---|---|---|---|
| RELATIVE VALUE $R_N$ (NON-DOT) | 0 | 0 | 0 | 0 |
| RELATIVE VALUE $R_S$ (SMALL-DOT) | 106 | 94 | 110 | 111 |
| RELATIVE VALUE $R_M$ (MEDIUM-DOT) | 192 | 180 | 195 | 197 |
| RELATIVE VALUE $R_L$ (LARGE-DOT) | 255 | 255 | 255 | 255 |

| | CYAN | MAGENTA | YELLOW | BLACK |
|---|---|---|---|---|
| THRESHOLD $T_{NS}$ FOR NON-DOT OR SMALL DOT | 0 | 0 | 0 | 0 |
| THRESHOLD $T_{SM}$ FOR SMALL DOT OR MEDIUM DOT | 106 | 94 | 110 | 111 |
| THRESHOLD $T_{ML}$ FOR MEDIUM DOT OR LARGE DOT | 192 | 180 | 195 | 197 |

NO NOISE ADDED

NOISE ADDED

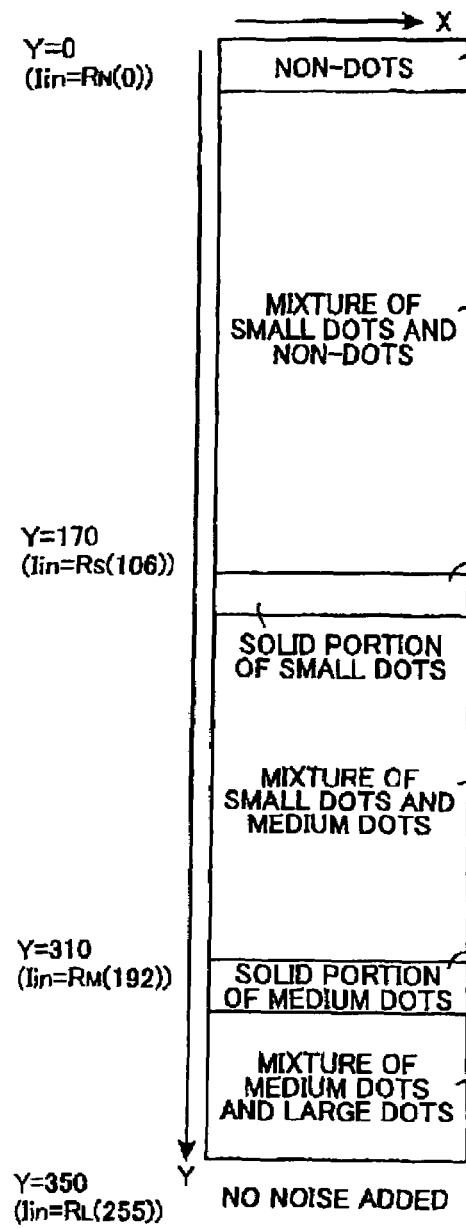
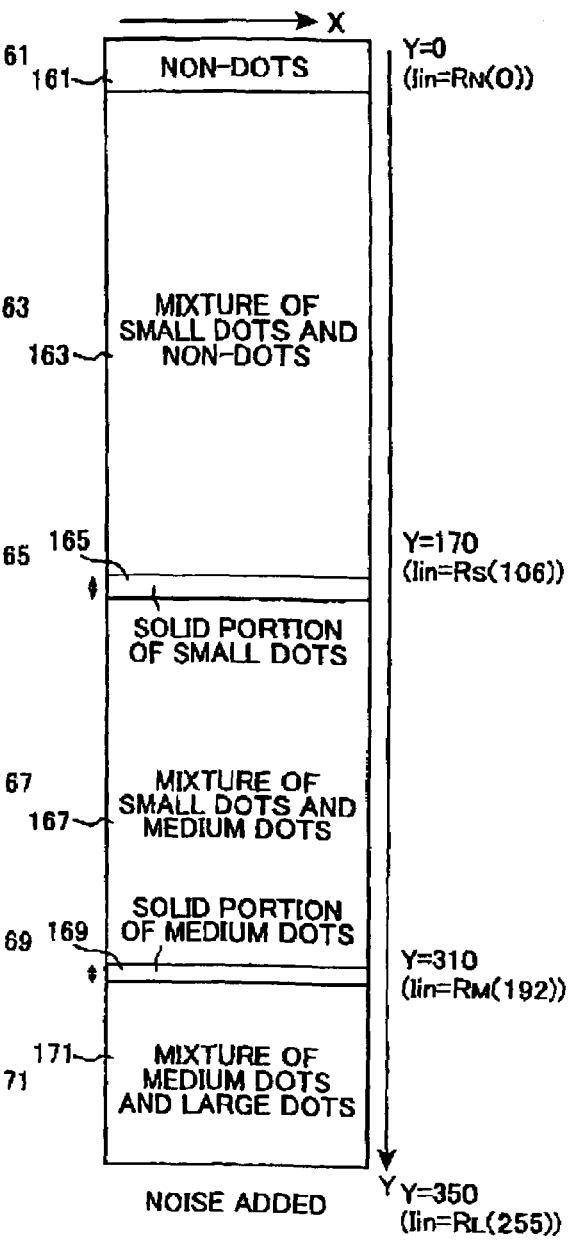
FIG.10(a) NO NOISE ADDED
FIG.10(b) NOISE ADDED

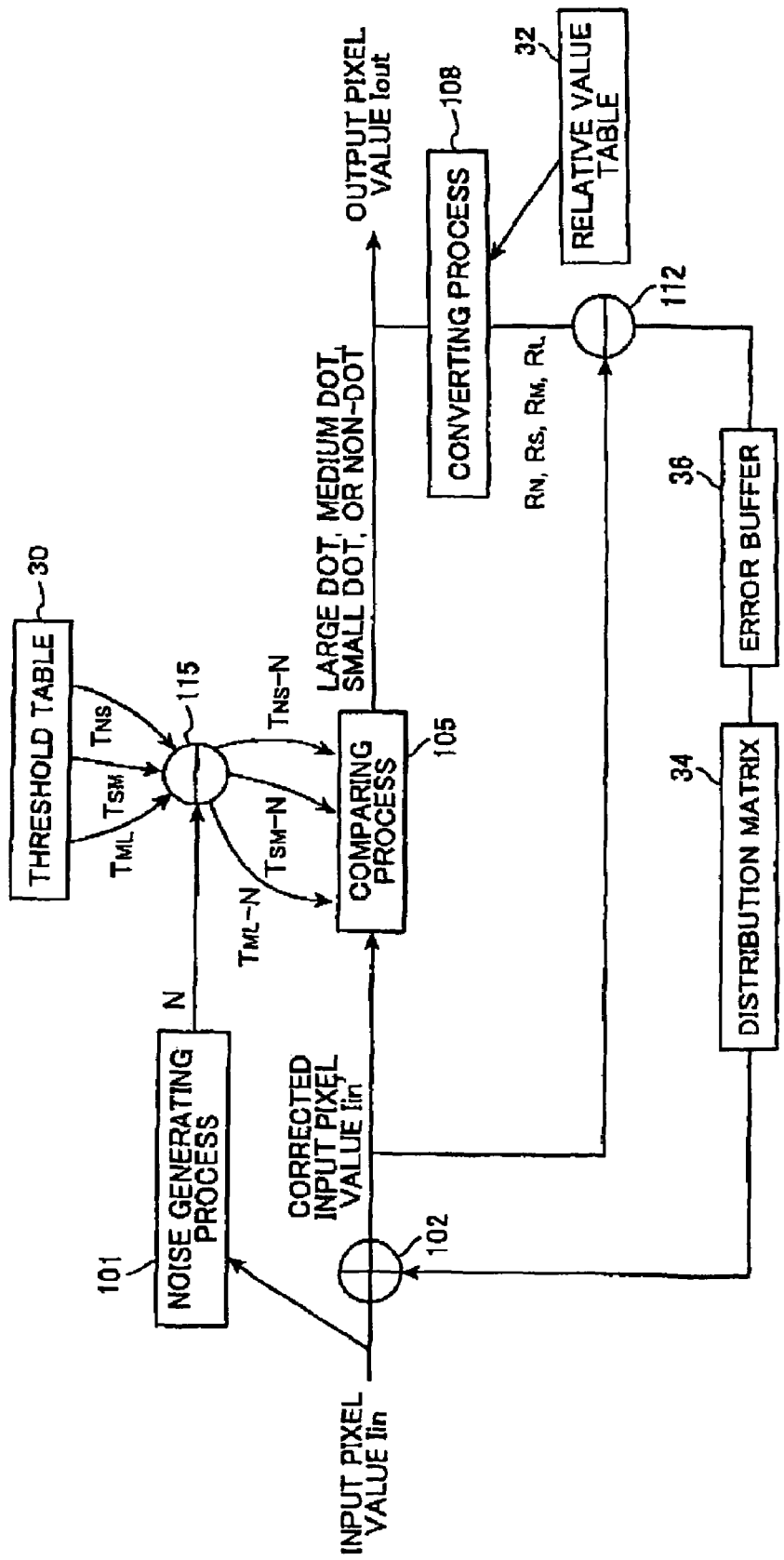

IMAGE PROCESSING DEVICE AND IMAGE PROCESSING METHOD

CROSS-REFERENCE TO RELATED APPLICATION

This application is a Continuation-In-Part of application Ser. No. 10/244,382 filed Sep. 17, 2002. The entire disclosure of the prior application is hereby incorporated by reference herein in its entirety.

BACKGROUND OF THE INVENTION

1. Field of the Invention

The present invention relates to an image processing device and an image processing method, and more particularly to an image processing device and an image processing method that perform quantization to convert input image data into output image data while distributing error between input image data and output image data to image data of not-yet-processed peripheral pixels.

2. Description of Related Art

Recently, color printers, such as ink-jet printers, that have a print head for ejecting ink of a plurality of colors have become popular as computer output devices, and are widely used for executing multi-color and multi-tone printing of images processed by a computer or the like. The ink-jet printer reproduces tones corresponding to input tone data (gray-scale data) by controlling the dot generation ratio in each area.

An error distribution method has been proposed to control dot generation on a pixel-by-pixel basis. This method controls dot formation to decrease the density error of an overall image by determining an error that occurs on a pixel due to mismatch between density represented by input tone data and density actually reproduced by the presence or absence of dot formation and by distributing the error to peripheral unprocessed pixels. Presence or absence of dot formation at each pixel is determined based on corrected tone data that is produced by distributing errors to the original input tone data of the subject pixel from already-processed peripheral pixels. With this error distribution method, the overall image error can be made extremely small, and output image quality can be improved.

Recently, there have been proposed ink-jet printers of a type that can reproduce three or more values per dot by varying the dot size, rather than reproducing two values by simply turning a dot on or off. A multi-value error distribution method has been proposed to handle three or more values.

According to the multi-value error distribution method, however, so-called false edges occur in parts of a gradation image where tones vary continuously.

SUMMARY OF THE INVENTION

In view of the above-described drawbacks, it is an objective of the present invention to provide an image processing device and an image processing method that can effectively reduce false edges.

In order to attain the above and other objects, the present invention provides an image processing device, including: an input portion; an input pixel value correcting portion; a noise providing portion; an output portion; and an error calculating portion. The input portion receives an input pixel value for one pixel, the input pixel value indicating either one of a first predetermined number of different first tone levels, the first predetermined number being greater than or equal to three. The input pixel value correcting portion corrects the input pixel value for the pixel based on errors that have been generated at already-processed pixels, thereby determining a corrected input pixel value. The noise providing portion provides a noise to either one of the corrected input pixel value and at least one threshold by executing either one of a noise value adding process and a noise value subtracting process, the noise value adding process adding a noise value to the corrected input pixel value, the noise value subtracting process subtracting the noise value from the at least one threshold. The output portion compares a noise-value-added corrected input pixel value with the at least one threshold when the corrected input pixel value is added with the noise value, and compares the corrected input pixel value with at least one noise-value-subtracted threshold when the noise value is subtracted from the at least one threshold, thereby outputting an output pixel value based on a compared result, the output pixel value indicating either one of a second predetermined number of different second tone levels, the second predetermined number being smaller than the first predetermined number but being greater than one. The error calculating portion calculates a difference between the corrected input pixel value and a relative value corresponding to the output pixel value, the relative value being either one of a plurality of relative values that correspond to the second predetermined number of different second tone levels. The noise providing portion provides the noise to the either one of the corrected input pixel value and the at least one threshold when the input pixel value is equal to either one of at least one relative value among the plurality of relative values and at least one adjacent value that is adjacent to the at least one relative value.

According to another aspect, the present invention provides an image processing device, including: an input portion; an input pixel value correcting portion; a noise providing portion; an output portion; and an error calculating portion. The input portion receives an input pixel value for one pixel, the input pixel value indicating either one of a first predetermined number of different first tone levels, the first predetermined number being greater than or equal to three. The input pixel value correcting portion corrects the input pixel value for the pixel based on errors that have been generated at already-processed pixels, thereby determining a corrected input pixel value. The noise providing portion provides a noise to either one of the corrected input pixel value and at least one threshold by executing either one of a noise value adding process and a noise value subtracting process, the noise value adding process adding a noise value to the corrected input pixel value, the noise value subtracting process subtracting the noise value from the at least one threshold. The output portion compares a noise-value-added corrected input pixel value with the at least one threshold when the corrected input pixel value is added with the noise value, and compares the corrected input pixel value with at least one noise-value-subtracted threshold when the noise value is subtracted from the at least one threshold, thereby outputting an output pixel value based on a compared result, the output pixel value indicating either one of a second predetermined number of, different second tone levels, the second predetermined number being smaller than the first predetermined number but being greater than one. The error calculating portion calculates a difference between the corrected input pixel value and a relative value corresponding to the output pixel value, the relative value being either one of a plurality of relative values that correspond to the second predetermined number of different second tone levels. The noise providing portion provides the noise to the either one of the corrected input pixel value and the at least one threshold when the input pixel value is equal to either one of at least one relative value among the plurality of relative values and at least one shifted value that is shifted from the at least one relative value by a predetermined amount. The noise providing portion sets the noise value to allow a sum of the noise value and the input pixel value to be greater than or equal to a lower next threshold when the at least one threshold includes the lower next threshold, the lower next threshold corresponding to a lower next relative value that is lower than and next to the at least one relative value. The noise providing portion sets the noise value to allow a sum of the noise value and the input pixel value to be smaller than or equal to a higher next threshold when the at least one threshold includes the higher next threshold, the higher next threshold corresponding to a higher next relative value that is higher than and next to the at least one relative value.

According to another aspect, the present invention provides an image processing device, including: an input portion; an input pixel value correcting portion: a noise providing portion; an output portion; and an error calculating portion. The input portion receives an input pixel value for one pixel, the input pixel value indicating either one of a first predetermined number of different first tone levels, the first predetermined number being greater than or equal to three. The input pixel value correcting portion corrects the input pixel value for the pixel based on errors that have been generated at already-processed pixels, thereby determining a corrected input pixel value. The noise providing portion provides a noise to either one of the corrected input pixel value and at least one threshold by executing either one of a noise value adding process and a noise value subtracting process, the noise value adding process adding a noise value to the corrected input pixel value, the noise value subtracting process subtracting the noise value from the at least one threshold. The output portion compares a noise-value-added corrected input pixel value with the at least one threshold when the corrected input pixel value is added with the noise value, and compares the corrected input pixel value with at least one noise-value-subtracted threshold when the noise value is subtracted from the at least one threshold, thereby outputting an output pixel value based on a compared result, the output pixel value indicating either one of a second predetermined number of different second tone levels, the second predetermined number being smaller than the first predetermined number but being greater than one. The error calculating portion calculates a difference between the corrected input pixel value and a relative value corresponding to the output pixel value, the relative value being either one of a plurality of relative values that correspond to the second predetermined number of different second tone levels. The noise providing portion sets the noise value to allow a sum of the noise value and the input pixel value to be greater than or equal to a lower next-to-nearest threshold when the at least one threshold includes the lower next-to-nearest threshold, the lower next-to-nearest threshold corresponding to a lower next-to-nearest relative value that is lower than and next to a nearest relative value that is the nearest to the input pixel value among the plurality of relative values. The noise providing portion sets the noise value to allow the sum of the noise value and the input pixel value to be smaller than or equal to a higher next-to-nearest threshold when the at least one threshold includes the higher next-to-nearest threshold, the higher next-to-nearest threshold corresponding to a higher next-to-nearest relative value that is higher than and next to the nearest relative.

According to another aspect, the present invention provides an image processing method, including: receiving an input pixel value for one pixel, the input pixel value indicating either one of a first predetermined number of different first tone levels, the first predetermined number being greater than or equal to three; correcting the input pixel value for the pixel based on errors that have been generated at already-processed pixels, thereby determining a corrected input pixel value; providing a noise to either one of the corrected input pixel value and at least one threshold by executing either one of a noise value adding process and a noise value subtracting process, the noise value adding process adding a noise value to the corrected input pixel value, the noise value subtracting process Subtracting the noise value from the at least one threshold; comparing a noise-value-added corrected input pixel value with the at least one threshold when the corrected input pixel value is added with the noise value and comparing the corrected input pixel value with at least one noise-value-subtracted threshold when the noise value is subtracted from the at least one threshold, thereby outputting an output pixel value based on a compared result, the output pixel value indicating either one of a second predetermined number of different second tone levels, the second predetermined number being smaller than the first predetermined number but being greater than one; and calculating a difference between the corrected input pixel value and a relative value corresponding to the output pixel value, the relative value being either one of a plurality of relative values that correspond to the second predetermined number of different second tone levels, the noise providing step providing the noise to the either one of the corrected input pixel value and the at least one threshold when the input pixel value is equal to either one of at least one relative value among the plurality of relative values and at least one adjacent value that is adjacent to the at least one relative value.

According to another aspect, the present invention provides an image processing method, including: receiving an input pixel value for one pixel, the input pixel value indicating either one of a first predetermined number of different first tone levels, the first predetermined number being greater than or equal to three; correcting the input pixel value for the pixel based on errors that have been generated at already-processed pixels, thereby determining a corrected input pixel value; providing a noise to either one of the corrected input pixel value and at least one threshold by executing either one of a noise value adding process and a noise value subtracting process, the noise value adding process adding a noise value to the corrected input pixel value, the noise value subtracting process subtracting the noise value from the at least one threshold; comparing a noise-value-added corrected input pixel value with the at least one threshold when the corrected input pixel value is added with the noise value and comparing the corrected input pixel value with at least one noise-value-subtracted threshold when the noise value is subtracted from the at least one threshold, thereby outputting an output pixel value based on a compared result, the output pixel value indicating either one of a second predetermined number of different second tone levels, the second predetermined number being smaller than the first predetermined number but being greater than one; and calculating a difference between the corrected input pixel value and a relative value corresponding to the output pixel value, the relative value being either one of a plurality of relative values that correspond to the second predetermined number of different second tone levels, the noise providing step providing the noise to the either one of the corrected input pixel value and the at least one threshold when the input pixel value is equal to either one of at least one relative value among the plurality of relative values and at least one shifted value that is shifted from the at least one relative value by a predetermined amount, the noise providing step setting the noise value to allow a sum of the noise value and the input pixel value to be greater than or equal to a lower next threshold when the at least one threshold includes the lower next threshold, the lower next threshold corresponding to a lower next relative value that is lower than and next to the at least one relative value, and the noise providing step setting the noise value to allow a sum of the noise value and the input pixel value to be smaller than or equal to a higher next threshold when the at least one threshold includes the higher next threshold, the higher next threshold corresponding to a higher next relative value that is higher than and next to the at least one relative value.

According to another aspect, the present invention provides an image processing method, including: receiving an input pixel value for one pixel, the input pixel value indicating either one of a first predetermined number of different first tone levels, the first predetermined number being greater than or equal to three; correcting the input pixel value for the pixel based on errors that have been generated at already-processed pixels, thereby determining a corrected input pixel value; providing a noise to either one of the corrected input pixel value and at least one threshold by executing either one of a noise value adding process and a noise value subtracting process, the noise value adding process adding a noise value to the corrected input pixel value, the noise value subtracting process subtracting the noise value from the at least one threshold; comparing a noise-value-added corrected input pixel value with the at least one threshold when the corrected input pixel value is added with the noise value and comparing the corrected input pixel value with at least one noise-value-subtracted threshold when the noise value is subtracted from the at least one threshold, thereby outputting an output pixel value based on a compared result, the output pixel value indicating either one of a second predetermined number of different second tone levels, the second predetermined number being smaller than the first predetermined number but being greater than one; and calculating a difference between the corrected input pixel value and a relative value corresponding to the output pixel value, the relative value being either one of a plurality of relative values that correspond to the second predetermined number of different second tone levels, the noise providing step setting the noise value to allow a sum of the noise value and the input pixel value to be greater than or equal to a lower next-to-nearest threshold when the at least one threshold includes the lower next-to-nearest threshold, the lower next-to-nearest threshold corresponding to a lower next-to-nearest relative value that is lower than and next to a nearest relative value that is the nearest to the input pixel value among the plurality of relative values, and the noise providing step setting the noise value to allow the sum of the noise value and the input pixel value to be smaller than or equal to a higher next-to-nearest threshold when the at least one threshold includes the higher next-to-nearest threshold, the higher next-to-nearest threshold corresponding to a higher next-to-nearest relative value that is higher than and next to the nearest relative.

According to another aspect, the present invention provides a storage medium storing an image processing program readable by a computer, the image processing program including: an input pixel value receiving program; a correcting program; a noise providing program; a comparing program; and a difference calculating program. The input pixel value receiving program receives an input pixel value for one pixel, the input pixel value indicating either one of a first predetermined number of different first tone levels, the first predetermined number being greater than or equal to three. The correcting program corrects the input pixel value for the pixel based on errors that have been generated at already-processed pixels, thereby determining a corrected input pixel value. The noise providing program provides a noise to either one of the corrected input pixel value and at least one threshold by executing either one of a noise value adding process and a noise value subtracting process, the noise value adding process adding a noise value to the corrected input pixel value, the noise value subtracting process subtracting the noise value from the at least one threshold. The comparing program compares a noise-value-added corrected input pixel value with the at least one threshold when the corrected input pixel value is added with the noise value and compares the corrected input pixel value with at least one noise-value-subtracted threshold when the noise value is subtracted from the at least one threshold, thereby outputting an output pixel value based on a compared result, the output pixel value indicating either one of a second predetermined number of different second tone levels, the second predetermined number being smaller than the first predetermined number but being greater than one. The difference calculating program calculates a difference between the corrected input pixel value and a relative value corresponding to the output pixel value, the relative value being either one of a plurality of relative values that correspond to the second predetermined number of different second tone levels. The noise providing program provides the noise to the either one of the corrected input pixel value and the at least one threshold when the input pixel value is equal to either one of at least one relative value among the plurality of relative values and at least one adjacent value that is adjacent to the at least one relative value.

According to another aspect, the present invention provides a storage medium storing an image processing program readable by a computer, the image processing program including: an input pixel value receiving program; a correcting program; a noise providing program; a comparing program; and a difference calculating program. The input pixel value receiving program receives an input pixel value for one pixel, the input pixel value indicating either one of a first predetermined number of different first tone levels, the first predetermined number being greater than or equal to three. The correcting program corrects the input pixel value for the pixel based on errors that have been generated at already-processed pixels, thereby determining a corrected input pixel value. The noise providing program provides a noise to either one of the corrected input pixel value and at least one threshold by executing either one of a noise value adding process and a noise value subtracting process, the noise value adding process adding a noise value to the corrected input pixel value, the noise value subtracting process subtracting the noise value from the at least one threshold. The comparing program compares a noise-value-added corrected input pixel value with the at least one threshold when the corrected input pixel value is added with the noise value and compares the corrected input pixel value with at least one noise-value-subtracted threshold when the noise value is subtracted from the at least one threshold, thereby outputting an output pixel value based on a compared result, the output pixel value indicating either one of a second predetermined number of different second tone levels, the second predetermined number being smaller than the first predetermined number but being greater than one. The difference calculating program calculates a difference between the corrected input pixel value and a relative value corresponding to the output pixel value, the relative value being either one of a plurality of relative values that correspond to the second predetermined number of different second tone levels. The noise providing program provides the noise to the either one of the corrected input pixel value and the at least one threshold when the input pixel value is equal to either one of at least one relative value among the plurality of relative values and at least one shifted value that is shifted from the at least one relative value by a predetermined amount. The noise providing program sets the noise value to allow a sum of the noise value and the input pixel value to be greater than or equal to a lower next threshold when the at least one threshold includes the lower next threshold, the lower next threshold corresponding to a lower next relative value that is lower than and next to the at least one relative value. The noise providing program sets the noise value to allow a sum of the noise value and the input pixel value to be smaller than or equal to a higher next threshold when the at least one threshold includes the higher next threshold, the higher next threshold corresponding to a higher next relative value that is higher than and next to the at least one relative value.

According to another aspect, the present invention provides a storage medium storing an image processing program readable by a computer, the image processing program including: an input pixel value receiving program; a correcting program; a noise providing program; a comparing program; and a difference calculating program. The input pixel value receiving program receives an input pixel value for one pixel, the input pixel value indicating either one of a first predetermined number of different first tone levels, the first predetermined number being greater than or equal to three. The correcting program corrects the input pixel value for the pixel based on errors that have been generated at already-processed pixels, thereby determining a corrected input pixel value. The noise providing program provides a noise to either one of the corrected input pixel value and at least one threshold by executing either one of a noise value adding process and a noise value subtracting process, the noise value adding process adding a noise value to the corrected input pixel value, the noise value subtracting process subtracting the noise value from the at least one threshold. The comparing program compares a noise-value-added corrected input pixel value with the at least one threshold when the corrected input pixel value is added with the noise value and compares the corrected input pixel value with at least one noise-value-subtracted threshold when the noise value is subtracted from the at least one threshold, thereby outputting an output pixel value based on a compared result, the output pixel value indicating either one of a second predetermined number of different second tone levels, the second predetermined number being smaller than the first predetermined number but being greater than one. The difference calculating program calculates a difference between the corrected input pixel value and a relative value corresponding to the output pixel value, the relative value being either one of a plurality of relative values that correspond to the second predetermined number of different second tone levels. The noise providing program sets the noise value to allow a sum of the noise value and the input pixel value to be greater than or equal to a lower next-to-nearest threshold when the at least one threshold includes the lower next-to-nearest threshold, the lower next-to-nearest threshold corresponding to a lower next-to-nearest relative value that is lower than and next to a nearest relative value that is the nearest to the input pixel value among the plurality of relative values. The noise providing program sets the noise value to allow the sum of the noise value and the input pixel value to be smaller than or equal to a higher next-to-nearest threshold when the at least one threshold includes the higher next-to-nearest threshold, the higher next-to-nearest threshold corresponding to a higher next-to-nearest relative value that is higher than and next to the nearest relative.

BRIEF DESCRIPTION OF THE DRAWINGS

The above and other objects, features and advantages of the invention will become more apparent from reading the following description of the preferred embodiment taken in connection with the accompanying drawings in which:

FIG. 3 illustrates an example of a distribution matrix;

FIG. 4 illustrates an example of a relative value table;

FIG. 5 illustrates an example of a threshold table;

FIG. 10(a) schematically shows the dot situations of the printed image in FIG. 9(a);

FIG. 10(b) schematically shows the dot situations of the printed image in FIG. 9(b);

FIG. 14 is a block diagram showing a multi-value error-distribution process according to a modification of the present invention.

DETAILED DESCRIPTION OF THE PREFERRED EMBODIMENT

Figure 1:
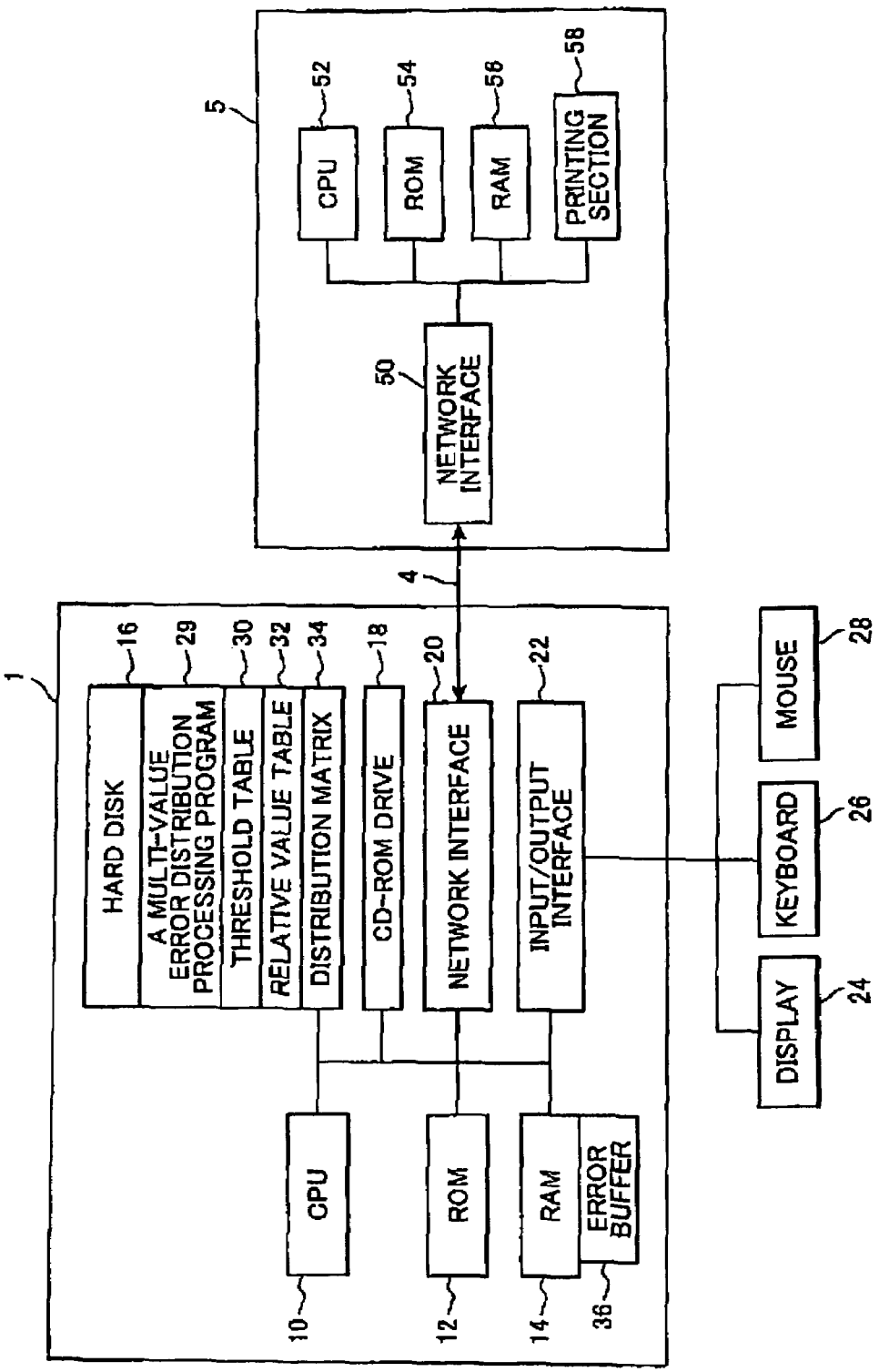
FIG. 1 is a block diagram showing the structure of an image processing device according to an embodiment of the present invention.

An image processing device and an image processing method according to a preferred embodiment of the present invention will be described while referring to the accompanying drawings wherein like parts and components are designated by the same reference numerals to avoid duplicating description.

The structure of the image processing device 1 of the present embodiment will be described with reference to FIG. 1.

The image processing device 1 is constructed from a personal computer. The image processing device 1 is connected to a printer 5 via a network 4.

The image processing device 1 executes the multi-value error distribution processing onto input image data for each of cyan, magenta, yellow, and black inks For each color, the input image data for each pixel (which will be referred to as an "input pixel value Iin" hereinafter) represents either one of 256 different tones of 0 to 255. For each color, the image processing device 1 converts one input pixel value Iin into an output pixel value Iout. The output pixel value Iout represents either one of four different tones. The input pixel value Iin is an eight-bit value and is either one of 256 different values that are greater than or equal to 0 and smaller than or equal to 255. The maximum value and the minimum value, which the input pixel value Iin will possibly become, will be referred to as an input maximum value Imax and an input minimum value Imin, respectively. In this example, the input maximum value Imax is equal to 255 and the input minimum value Imin is equal to zero (0) The output pixel value Iout indicates either one of four different states: output of a large-dot, output of a medium-dot, output of a small-dot, and output of no dot. Based on the output pixel value Iout for each pixel for each color, the printer 5 prints a four-tone pixel image at the subject pixel by the corresponding color ink.

The image processing device 1 includes: a CPU 10, a ROM 12, a RAM 14, a hard disk (HD) 16, a CD-ROM drive 18, a network interface 20, and an input/output interface 22. The input/output interface 22 is connected to a display 24, a keyboard 26, and a mouse 28.

The CPU 10 controls operation of the entire image processing device 1 by executing programs stored in the ROM 12, programs stored in the hard disk (HD) 16, programs supplied via the CD-ROM drive 18 from a CD-ROM (not shown).

The ROM 12 stores therein programs and data required to execute operation of the image processing device 1.

The hard disk (HD) 16 stores therein: a multi-value error distribution processing program 29 according to the present embodiment; a threshold table 30; a relative value table 32; and a distribution matrix 34.

The hard disk (HD) 16 further stores therein application programs for creating image data and for instructing printing of the image data.

A work area is prepared in the RAM 14 for storing image data. An error buffer 36 is also prepared in the RAM 14.

The network interface 20 is connected to the network 4.

The CPU 10 controls the display 24 via the input/output interface 22 to show desired screens and receives a user's instruction inputted via the keyboard 26 and the mouse 28 via the input/output interface 22.

When the user instructs the application program to print an image, the CPU 10 executes the multi-value error distribution processing program 29 to input each input pixel value Iin into an output pixel value Iout and to output the output pixel value Iout to the printer 5.

The printer 5 includes: a network interface 50; a CPU 52; a ROM 54; a RAM 56; and a printing section 58. The network interface 50 is connected to the network 4. The printing section 58 can perform printing by using ink of four colors of cyan, magenta, yellow, and black. The RAM 56 temporarily stores the output pixel values Iout supplied from the image processing device 1. The CPU 52 executes a printing program stored in the ROM 54 to control the printing section 58 to print the output pixel values Iout stored in the RAM 56.

Figure 2:
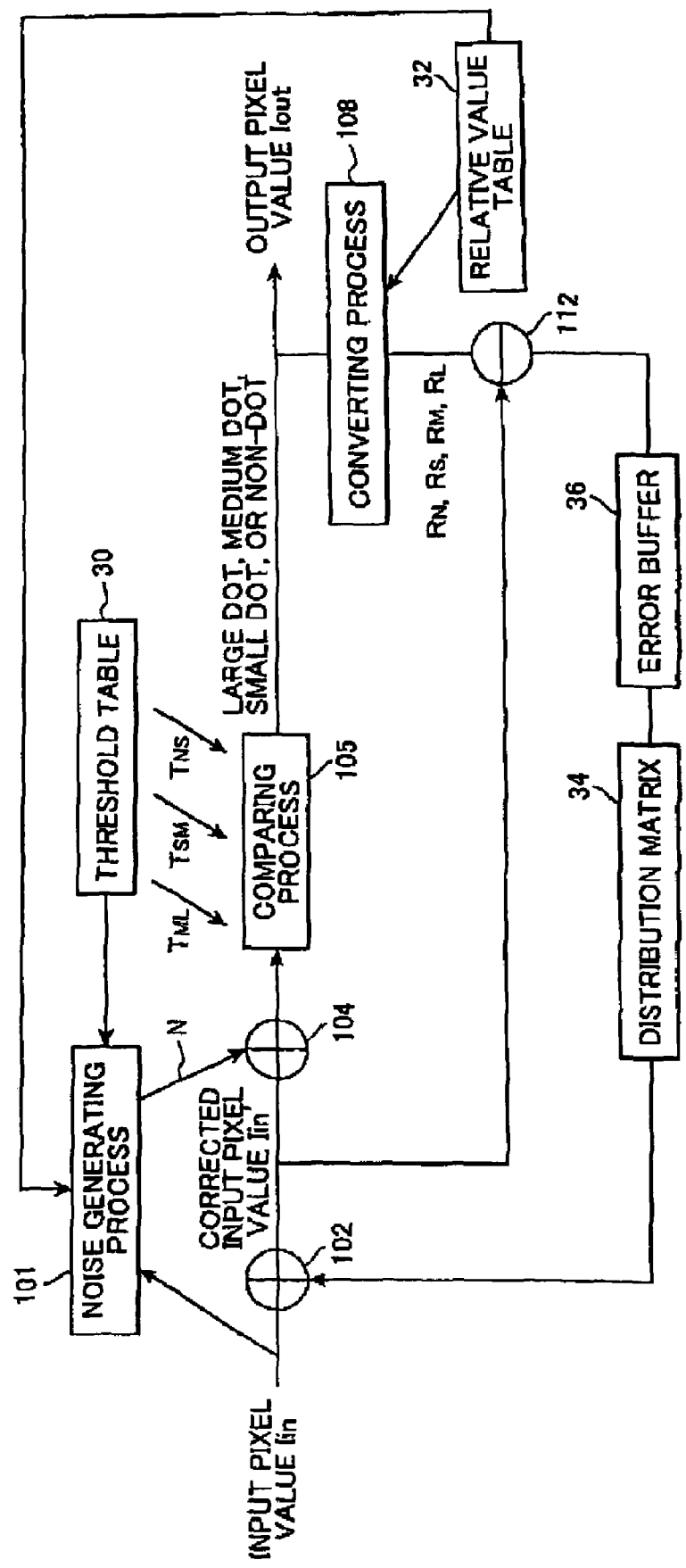
FIG. 2 is a block diagram showing a multi-value error-distribution process according to the embodiment executed by the image processing device of FIG. 1.

As shown in FIG. 2, the CPU 10 executes the multi-value error distribution processing program 29 to perform a noise generating process 101, an input pixel value correcting process 102, a noise value adding process 104, a comparing process 105, a converting process 108, and an error calculating process 112.

An image has a plurality of pixels, The plurality of pixels are arranged two-dimensionally along predetermined X and Y directions, which extend perpendicularly to each other. More specifically, (Xmax+1)×(Ymax+1) number of pixels are arranged by the (Ymax+1) number of rows by the (Xmax+1) number of columns. According to the multi-value error distribution processing, first, all the pixels (0, 0) to (Xmax, 0) located on the first line, which is located on the Y position 0 and which extends along the X direction, are processed pixels one by one from (0, 0) to (Xmax, 0). Next, all the pixels (0, 1) to (Xmax, 1) located on the second line, which is located on the Y position 1 and which extends along the X direction, are processed pixels one by one from (0, 1) to (Xmax, 1). In this way, all the pixels in the lines from Y=0 to Y=Ymax−1 are processed lines one by one. Finally, all the pixels (0, Ymax) to (Xmax, Ymax) located on the last line, which is located on the Y position Ymax and which extends along the X direction, are processed pixels one by one from (0, Ymax) to (Xmax, Ymax).

The distribution matrix 34 stores therein a plurality of (twelve, in this example) weighting coefficients as shown in FIG. 3. The distribution matrix 34 is used to distribute, to the input pixel value Iin at one pixel (X, Y), those errors that are generated at already-processed twelve neighboring pixels (X−2, Y−2), (X−1, Y−2), (X, Y−2), (X+1, y−2), (X+2, Y−2), (X−2, Y−1), (X−1, Y−1), (X, Y−1), (X+1, Y−1), (X+2, Y−1), (X−2, Y), and (X−1, Y) that are located adjacent to the subject pixel (X, Y).

As shown in FIG. 4, the relative value table 32 stores, for each color, relative values $R_L$, $R_M$, $R_S$, and $R_N$ for the large-dot, medium-dot, small-dot, and non-dot, respectively. The relative values $R_L$, $R_M$, $R_S$, and $R_N$ indicate density values of a large-dot, a medium-dot, a small-dot, and a non-dot relative to the density value of a large-dot, which is assumingly set to 255. It is noted that the relative values $R_L$, $R_M$, $R_S$, and $R_N$ vary according to the printing condition of the printer 5, such as the types of ink to be used, types of media onto which printing is to be performed, and a resolution. The relative value table 32 therefore stores therein a plurality of sets of relative values $R_L$, $R_M$, $R_S$, and $R_N$ in one-to-one correspondence with a plurality of different printing conditions. FIG. 4 shows one set of relative values $R_L$, $R_M$, $R_S$, and $R_N$ in correspondence with one printing condition.

FIG. 5 shows the threshold table 30. The threshold table 30 stores, for each color, thresholds $T_{NS}$, $T_{SM}$, and $T_{ML}$. The threshold $T_{NS}$ is used for determining output of a non-dot or a small-dot. The threshold $T_{SM}$ is used for determining output of a small-dot or a medium-dot. The threshold $T_{ML}$ is used for determining output of a medium-dot or a large-dot. For each color, the thresholds $T_{NS}$, $T_{SM}$, and $T_{ML}$ satisfy the relationship of $T_{ML} > T_{SM} > T_{NS}$. The thresholds $T_{NS}$, $T_{SM}$, and $T_{ML}$ correspond to the relative values $R_N$, $R_S$, and $R_M$, respectively. In this example, the thresholds $T_{NS}$, $T_{SM}$, and $T_{ML}$ are equal to the corresponding relative values $R_N$, $R_S$, and $R_M$, respectively.

The CPU 10 executes the multi-value error distribution processing program 29 to operate as shown in FIG. 2.

More specifically, when the CPU 10 receives an input pixel value Iin (a value in a range of 0 to 255) for one pixel (X, Y) for one color (cyan, for example), the CPU 10 executes the noise generating process 101 to calculate a noise value N in correspondence with the input pixel value Iin.

Next will be described how to calculate the noise value N.

First, the CPU 10 reads out four relative values $R_N$, $R_S$, $R_M$, and $R_L$ (0, 106, 192, 255 in this example) for the subject color (cyan, in this example) from the relative value table 32. The CPU 10 determines values of "first rate," "second rate," "third rate," and "fourth rate" by calculating the following four equations:

first rate=1−[abs(*Iin*−$R_N$−*F*)]/Range};

second rate=1−[abs(*Iin*−$R_S$−*F*)]/Range};

third rate=1−[abs(Iin−$R_M$−F)]Range}; and fourth rate=1−[abs(Iin−$R_L$−F)]/Range}.

It is noted that "abs" is an operator for determining an absolute value of a value in the parenthesis. The value "F" is a shift amount, and is equal to two (2) in this example. The value "Range" is a noise-generating range, and is equal to ten (10) in this example. It is also noted that if the calculated result for each of the "first rate," "second rate," "third rate," and "fourth rate" becomes lower than or equal to zero (0), the subject value ("first rate," "second rate," "third rate," or "fourth rate") is forcibly set to zero (0). For example, if the calculated result of the equation "fourth rate=1−[abs (Iin−$R_L$−F)]/Range}" is lower than or equal to zero (0), the value "fourth rate" is forcibly set to zero (0).

Figure 6:
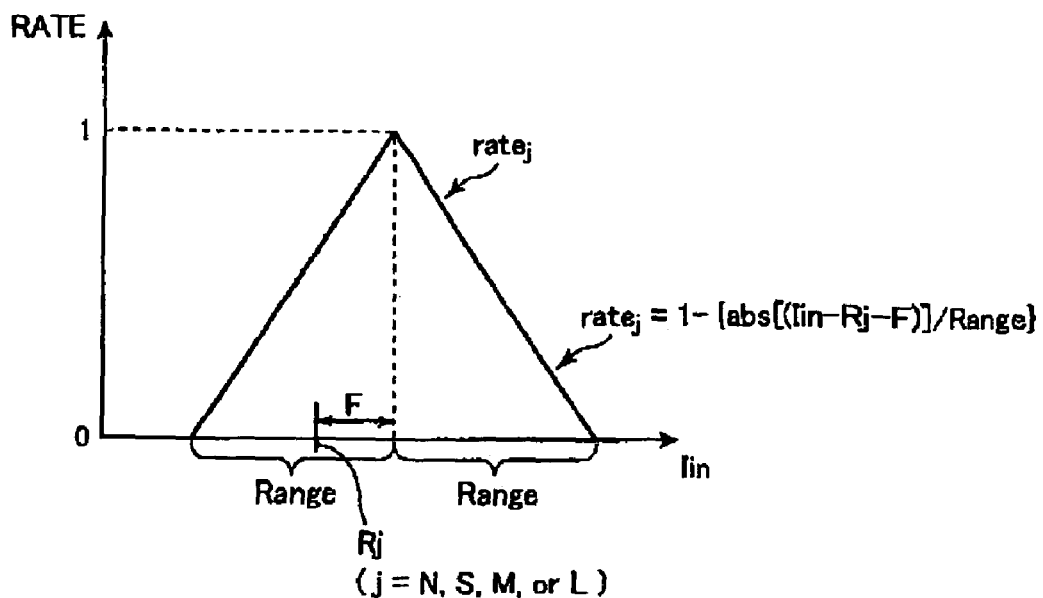
FIG. 6 illustrates how a "$rate_j$" changes dependently on the input pixel value.

The general equation for the "first rate," "second rate," "third rate," and "fourth rate" is represented by the following equation (1):

$$\text{rate}_j = 1 - [\text{abs}(Iin - R_j - F)]/\text{Range} \quad (1),$$

wherein $\text{rate}_j$ is the general expression of the "first rate," "second rate," "third rate," and "fourth rate," and j is either one of N, S, M, or L. FIG. 6 shows how the value "$\text{rate}_j$" defined by the equation (1) varies in accordance with the input pixel value Iin. In FIG. 6, the horizontal axis indicates the value Iin, while the vertical axis denotes the value "$\text{rate}_j$". As shown in FIG. 6, the value "$\text{rate}_j$" becomes the maximum value (1) when the value Iin is equal to the value of ($R_j$+F), the value "$\text{rate}_j$" gradually decreases as the value Iin moves away from the value of ($R_j$+F), and the value "$\text{rate}_j$" becomes zero (0) when the value Iin is smaller than or equal to the value of ($R_j$+F)−Range and when the value Iin is greater than or equal to the value of ($R_j$+F)+Range.

The CPU 10 then selects the maximum value among the "first rate," "second rate," "third rate," and "fourth rate," and sets the selected value as a value "rate" for the subject input pixel value Iin. Thus, the value "rate" is greater than or equal to zero (0).

Next, the CPU 10 calculates a value "coefficient" in a manner described below.

When the input pixel value Iin is greater than or equal to the input minimum value Imin (0, in this example) and smaller than the value ($R_N$+$R_S$)/2 (53, in this example), the CPU 10 reads out the threshold $T_{SM}$ (106, in this example), and sets the value "coefficient" to the value ($T_{SM}$−Imin)/G, wherein G is a predetermined normalization constant and is equal to 291 in this example. Accordingly, in this example, the CPU 10 sets the coefficient to the value 106/291.

On the other hand, when the input pixel value Iin is greater than or equal to the value ($R_N$+$R_S$)/2 (53, in this example) and smaller than the value ($R_S$+$R_M$)/2 (149, in this example), the CPU 10 reads out the thresholds $T_{ML}$, $T_{SM}$, and $T_{NS}$ (192, 106, and 0 in this example), and sets the value "coefficient" to a smaller one of the value ($T_{SM}$−$T_{NS}$)/G and the value ($T_{ML}$−$T_{SM}$)/G. In this example, the CPU 10 sets the value "coefficient" to the value 86/291, which is the smaller one of the values 106/291 and 86/291.

When the input pixel value Iin is greater than or equal to the value ($R_S$+$R_M$)/2 (149, in this example) and smaller than the value ($R_M$+$R_L$)/2 (224, in this example), the CPU 10 reads out the thresholds $T_{ML}$ and $T_{SM}$ (192 and 106 in this example), and sets the value "coefficient" to the smaller one of the value ($T_{ML}$−$T_{SM}$)/G and the value (Imax−$T_{ML}$)/G. In this example, the CPU 10 sets the value "coefficient" to the value 63/291, which is the smaller one of the values 86/291 and 63/291.

When the input pixel value Iin is greater than or equal to the value ($R_M$+$R_L$)/2 (224, in this example) and smaller than or equal to the input maximum value Imax (255, in this example), the CPU 10 reads out the threshold $T_{ML}$ (192, in this example), and sets the value "coefficient" to the value (Imax−$T_{ML}$)/G. Accordingly, in this example, the CPU 10 sets the value "coefficient" to the value 63/291.

Next, the CPU 10 generates a random number. It is noted that when the input pixel value Iin is greater than or equal to the input minimum value Imin (0, in this example) and smaller than the value ($R_N$+$R_S$)/2 (53, in this example), the CPU 10 generates the random number in a range of greater than or equal to zero (0) and smaller than or equal to +255.

When the input pixel value Iin is greater than or equal to the value ($R_N$+$R_S$)/2 (53, in this example) and smaller than the value ($R_M$+$R_L$)/2 (224, in this example), the CPU 10 generates the random number in a range of greater than or equal to −255 and smaller than or equal to +255.

When the input pixel value Iin is greater than or equal to the value ($R_M$+$R_L$)/2 (224, in this example) and smaller than or equal to the input maximum value Imax (255, in this example), the CPU 10 generates the random number in a range of greater than or equal to −255 and smaller than or equal to zero (0).

Next, the CPU 10 determines the noise value N by calculating a product of the values "rate," "coefficient", and the random number. In other words, the CPU 10 calculates the following formula (2):

$$\text{Noise } N = (\text{rate}) \times (\text{coefficient}) \times (\text{random number}) \quad (2)$$

Next, the CPU 10 executes the input pixel value correcting process 102. More specifically, the CPU 10 first reads out, from the error buffer 36, errors that have been occurred at already-processed twelve pixels that are located adjacent to the presently-being-processed pixel (X,Y). The CPU 10 multiplies the weighting coefficients to those errors according to the distribution matrix 34, and adds the resultant weighted sum to the input value Iin for the presently-being-processed pixel (X,Y), thereby determining a corrected input pixel value Iin'.

In other words, the CPU 10 adds, to the input pixel value Iin: a 1/48 part of an error generated at pixel (X−2, Y−2); a 3/48 part of an error generated at pixel (X−1,Y−2); a 5/48 part of an error generated at pixel (X, Y−2); a 3/48 part of an error generated at pixel (X+1, Y−2); a 1/48 part of an error generated at pixel (X+2,Y−2); a 3/48 part of an error generated at pixel (X−2, Y−1); a 5/48 part of an error generated at pixel (X−1, Y−1); a 7/48 part of an error generated at pixel (X, Y−1); a 5/48 part of an error generated at pixel (X+1,Y−1); a 3/48 part of an error generated at pixel (X+2,Y−1); a 5/48 part of an error generated at pixel (X−2, Y); and a 7/48 part of an error generated at pixel (X−1, Y), thereby determining the corrected input pixel value Iin'.

Next, the CPU 10 executes the noise value adding process 104 to add the noise value N to the corrected input pixel value Iin', thereby determining a value (Iin'+N).

Figure 7:
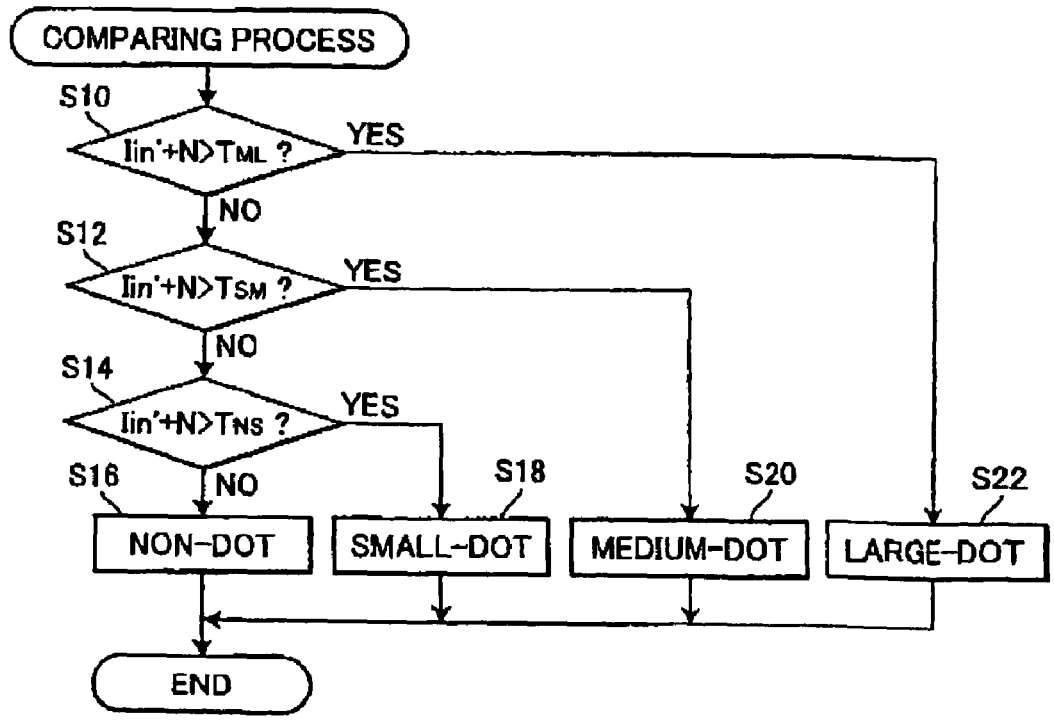
FIG. 7 is a flowchart of a comparing process.

Next, the CPU 10 executes the comparing process 105 as shown in FIG. 7.

First, the CPU 10 judges in S10 whether or not the value (Iin'+N) is greater than the threshold $T_{ML}$. If the value (Iin'+N) is greater than the threshold $T_{ML}$ (yes in S10), the CPU 10 sets a large dot in S22.

On the other hand, if the value (Iin'+N) is smaller than or equal to the threshold $T_{ML}$ (no in S10), the CPU 10 judges in S12 whether or not the value (Iin'+N) is greater than the threshold $T_{SM}$. If the value (Iin'+N) is greater than the threshold $T_{SM}$ (yes in S12), the CPU 10 sets a medium dot in S20.

On the other hand, if the value (Iin'+N) is smaller than or equal to the threshold $T_{SM}$ (no in S12), the CPU 10 judges in S14 whether or not the value (Iin'+N) is greater than the threshold $T_{NS}$ (S14). If the value (Iin'+N) is greater than the threshold $T_{NS}$ (yes in S14), the CPU 10 sets a small dot in S18.

On the other hand, if the value (Iin'+N) is smaller than or equal to the threshold $T_{NS}$ (no in S14), the CPU 10 sets a non-dot in S16.

The CPU 10 outputs the thus determined state (large dot, medium dot, small dot, or non-dot) as an output pixel value Iout to the printer 5.

It is noted that in each judgment process of S10, S12, S14, the CPU 10 judges whether or not the value (Iin'+N) is greater than the corresponding threshold. Accordingly, when the value (Iin'+N) is equal to the corresponding threshold, the judgment results negative, and an output value Iout is determined in the same manner as when the value (Iin'+N) is smaller than the corresponding threshold. However, each judgment process of S10, S12, S14 may be modified so that the CPU 10 judges whether or not the value (Iin'+N) is greater than or equal to the corresponding threshold. In this modification, if the value (Iin'+N) is equal to the corresponding threshold, the judgment results positive, and an output value Iout is determined in the same manner as when the value (Iin'+N) is greater than the corresponding threshold.

Next, the CPU 10 executes the converting process 108 to select one relative value $R_L$, $R_M$, $R_S$, or $R_N$ that corresponds to the output pixel value Iout, and reads out the selected relative value from the relative value table 32. More specifically, when the output pixel value Iout is a large dot, the CPU 10 selects and reads out the relative value $R_L$ from the relative value table 32. When the output pixel value Iout is a medium dot, the CPU 10 selects and reads out the relative value $R_M$ from the relative value table 32. When the output pixel value Iout is a small dot, the CPU 10 selects and reads out the relative value $R_S$ from the relative value table 32. When the output pixel value Iout is a non-dot, the CPU 10 selects and reads out the relative value $R_N$ from the relative value table 32.

Next, the CPU 10 executes the error calculating process 112 to calculate a difference between the corrected input pixel value Iin' and the read-out relative value $R_L$, $R_M$, $R_S$, or $R_N$, and records the calculated difference (error) in the error buffer 36.

In this way, processing of the input pixel value Iin for one pixel (X,Y) is completed, and the process goes to processing of the next pixel.

Next, the noise value N generated in the noise generating process 101 will be described in greater detail.

Figure 8:
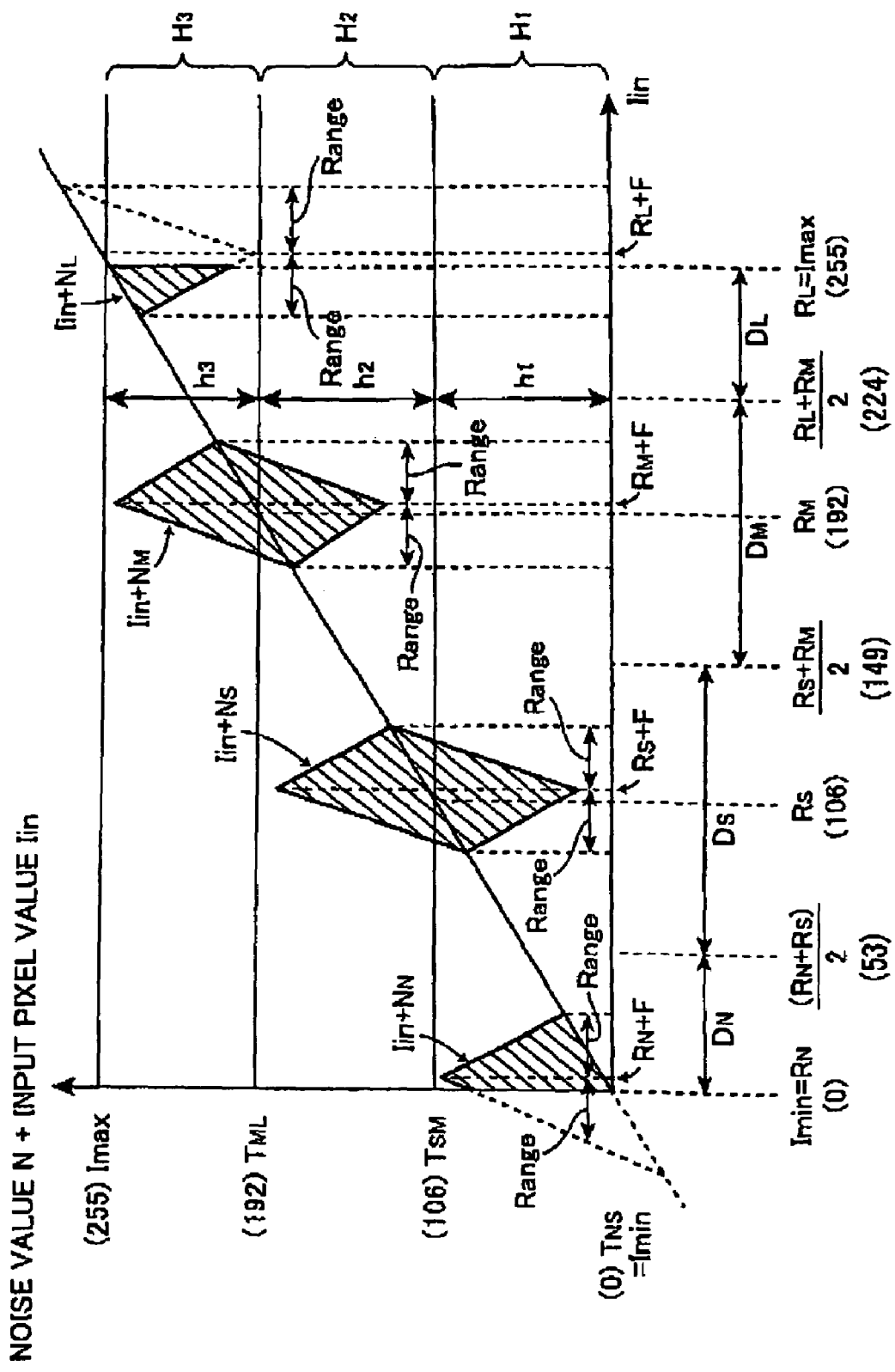
FIG. 8 illustrates how a range, in which a sum of an input pixel value and noise falls, dependently on the input pixel value.

FIG. 8 shows a relationship between the input pixel value Iin and the sum (Iin+N) of the input pixel value Iin and the noise value N. The horizontal axis indicates the input pixel value Iin, while the vertical axis indicates the sum of the noise value N and the input pixel value Iin. A range, in which the value (Iin+N) falls, is indicated as a hatched or shaded portion. The threshold values $T_{NS}$, $T_{SM}$, and $T_{ML}$ are also indicated along the vertical axis. The relative values $R_N$, $R_S$, $R_M$, and $R_L$ are also indicated along the horizontal axis. Specific values for the threshold values $T_{NS}$, $T_{SM}$, $T_{ML}$ and the relative values $R_N$, $R_S$, $R_M$, and $R_L$ for cyan color are also indicated in parentheses. The input minimum value Imin (0) and the input maximum value Imax (255) are also indicated along both of the vertical axis and the horizontal axis.

The input pixel value Iin is located in either one of regions $D_N$, $D_S$, $D_M$, and $D_L$, which are defined along the horizontal axis. The region $D_N$ is defined as greater than or equal to the input minimum value Imin (0) and smaller than the value $(R_N+R_S)/2$, the region $D_S$ is defined as greater than or equal to the value $(R_N+R_S)/2$ and smaller than the value $(R_S+R_M)/2$, the region $D_M$ is defined as greater than or equal to the value $(R_S+R_M)/2$ and smaller than the value $(R_M+R_L)/2$, and the region $D_L$ is defined as greater than or equal to the value $(R_N+R_L)/2$ and smaller than or equal to the input maximum value Imax (255).

Ranges H1, H2, and H3 are defined along the vertical axis. The range H1 is defined between the thresholds $T_{NS}$ and $T_{SM}$, the range H2 is defined between the thresholds $T_{SM}$ and $T_{ML}$, and the range H3 is defined between the threshold $T_{ML}$ and the input maximum value Imax (255). The ranges H1, H2, and H3 have widths h1, h2, and h3, respectively. The width h1 is equal to the value $(T_{SM}-T_{NS})$, the width h2 is equal to the value $(T_{ML}-T_{SM})$, and the width h3 is equal to the value (Imax (255)$-T_{ML}$). Because the threshold $T_{NS}$ is equal to the input minimum value Imin (0) in this example, the value h1 satisfies the following equation:

$$h1 = T_{SM} - T_{NS} = T_{SM} - Imin = T_{SM}.$$

It is noted that if a multi-value error distribution processing is executed to some image without addition of the noise value N, false edges will possibly occur at such a point where the input pixel value Iin is equal to either one of: the relative values $R_N$, $R_S$, $R_M$, and $R_L$ and their neighboring values $(R_N+F)$, $(R_S+F)$, $(R_M+F)$, and $(R_L+F)$.

For example, when an image to be processed is a gradation image whose density becomes gradually darker in the Y direction (which will be referred to as a "positive gradation image" hereinafter), as the pixels in the positive gradation image are processed gradually in the Y direction, there occurs delay of dot generation. False edges will possibly occur at portions of the image, where input pixel values Iin are slightly darker than the relative values $R_N$, $R_S$, $R_M$, and $R_L$, respectively. It is therefore known that densities slightly greater than the relative values $R_N$, $R_S$, $R_M$, and $R_L$ should be set as false-edge generating density values $(R_N+F)$, $(R_S+F)$, $(R_M+F)$, and $(R_L+F)$ and that noise should be generated when the input pixel value Iin is around either one of the false-edge generating density values $(R_N+F)$, $(R_S+F)$, $(R_M+F)$, and $(R_L+F)$. In this case, the shift amount F is greater than zero (0). For example, the shift amount F is two (2), for example, with respect to the input pixel value range of 0 to 255.

On the other hand, when an image to be processed is a negative gradation image whose density becomes gradually lighter in the Y direction, as the pixels in the negative gradation image are processed gradually in the Y direction, due to occurrence of dot generation delay, false edges will possibly occur at portions of the image, where input pixel values Iin are equal to the relative values $R_N$, $R_S$, $R_M$, and $R_L$ or are slightly lighter than the relative values $R_N$, $R_S$, $R_M$, and $R_L$. It is therefore known that densities equal to or slightly smaller than the relative values $R_N$, $R_S$, $R_M$, and $R_L$ should be set as false-edge generating density values $(R_N+F)$, $(R_S+F)$, $(R_M+F)$, and $(R_L+F)$ and that noise should be generated when the input pixel value Iin is around either one of the false-edge generating density values $(R_N+F)$ $(R_S+F)$, $(R_M+F)$, and $(R_L+F)$. In this case, the shift amount F is equal to or smaller than zero (0).

According to the present embodiment, therefore, in the noise generating process 101, noise is generated when the input pixel value Iin is in a range from the value "$(R_N+F)-$Range" to the value "$(R_N+F)+$Range", in another range from the value "$(R_S+F)-$Range" to the value "$(R_S+F)+$Range", in another range from the value "$(R_M+F)-$Range" to the value "$(R_M+F)+$Range", or in another range from the value "$(R_L+F)-$Range" to the value "$(R_L+F)+$Range".

It is noted that if the input pixel value Iin falls in the range from the value "$(R_N+F)$–Range" to the value "$(R_N+F)$+Range", the input pixel value Iin will fall in the region $D_N$, that if the input pixel value Iin falls in the range from the value "$(R_S+F)$–Range" to the value "$(R_S+F)$+Range", the input pixel value Iin will fall in the region $D_S$, that if the input pixel value Iin falls in the range from the value "$(R_M+F)$–Range" to the value "$(R_M+F)$+Range", the input pixel value Iin will fall in the region $D_M$, and that if the input pixel value Iin falls in the range from the value "$(R_L+F)$–Range" to the value "$(R_L+F)$+Range", the input pixel value Iin will fall in the region $D_L$. Accordingly, the input pixel value Iin falling in the range from the value "$(R_N+F)$–Range" to the value "$(R_N+F)$+Range" is the nearest to the relative value $R_N$ among all the relative values $R_N$, $R_S$, $R_M$, and $R_L$. The input pixel value Iin falling in the range from the value "$(R_S+F)$–Range" to the value "$(R_S+F)$+Range" is the nearest to the relative value $R_S$ among all the relative values $R_N$, $R_S$, $R_M$, and $R_L$. The input pixel value Iin falling in the range from the value "$(R_M+F)$–Range" to the value "$(R_M+F)$+Range" is the nearest to the relative value $R_M$ among all the relative values $R_N$, $R_S$, $R_M$, and $R_L$. The input pixel value Iin falling in the range from the value "$(R_L+F)$–Range" to the value "$(R_L+F)$+Range" is the nearest to the relative value $R_L$ among all the relative values $R_N$, $R_S$, $R_M$, and $R_L$.

In this way, during the noise generating process 101, noise is generated only when the input pixel value Iin falls within four regions, which are centered on the false-edge generating density values $(R_N+F)$, $(R_S+F)$, $(R_M+F)$, and $(R_L+F)$, respectively, and which have a width of 2×"Range". This is because if noise were generated for input pixel values Iin that fall in too wide regions, output images obtained by the output pixel values Iout will become rough and will be damaged. The present inventor performed experiments to confirm that an optimum value for the noise-generating range "Range" is ten (10) with respect to the input pixel value range of 0 to 255.

Next, the noise value N that is generated for each region will be described in greater detail.

The noise N (which will be referred to as $N_N$ hereinafter) that is generated when the input pixel value Iin falls in the range greater than or equal to the value "$(R_N+F)$–Range" and smaller than or equal to the value "$(R_N+F)$+Range" is defined by the following formula:

$$N_N = (coefficient)_N \times (rate)_N \times (random\ number)_N$$

The noise value $N_N$ is greater than or equal to zero (0).
The value $(rate)_N$ is defined by the following formula:

$$(rate)_N = \{1-[abs(Iin-R_N-F)/Range]\}.$$

The value $(rate)_N$ becomes the maximum value (1) when the input pixel value Iin is equal to the value $(R_N+F)$, gradually decreases as the input pixel value Iin goes away from the value $(R_N+F)$, and becomes zero (0) when the input pixel value Iin reaches the value $(R_N+F)$–Range or the value $(R_N+F)$+Range. This ensures that the noise value $N_N$ will not become too large, thereby preventing an output image from becoming rough or damaged.

The $(random\ number)_N$ is a white noise with no periodicity and is in a range greater than or equal to zero (0) and smaller than or equal to 255.

The $(coefficient)_N$ is such a value that ensures that the sum $(Iin+N_N)$ will fall in the range H1, that is, in the range between the input minimum value Imin (0) and the threshold $T_{SM}$ (106). The $(coefficient)_N$ of such a value can prevent the output image from becoming rough.

It is sufficient that the sum $(Iin+N_N)$ is greater than or equal to the input minimum value Imin (0). If the sum $(Iin+N_N)$ became smaller than the input minimum value Imin (0), the output image will tend to become rough and damaged.

It is also sufficient that the sum $(Iin+N_N)$ is smaller than or equal to the threshold $T_{SM}$ (106). If the sum $(Iin+N_N)$ exceeded the threshold $T_{SM}$ (106), the sum $(Iin'+N_N)$ of the corrected input pixel value Iin' and the noise $N_N$ will tend to exceed the threshold $T_{SM}$ (106) (yes in S12), to generate a medium dot erroneously and to make the output image rough.

It is preferable that the sum $(Iin+N_N)$ is smaller than the threshold $T_{SM}$ (106). If the sum $(Iin+N_N)$ became equal to the threshold $T_{SM}$ (106), the sum $(Iin'+N_N)$ will also tend to become equal to the threshold $T_{SM}$ (106). In such a case, if the judgment process of S12 is modified to judge whether the sum $(Iin'+N_N)$ is greater than or equal to the threshold $T_{SM}$ (106), a medium dot will erroneously be outputted.

More specifically, the $(coefficient)_N$ has such a positive value that depends on the width h1 of the range H1 and that is defined by the following formula:

$$(coefficient)_N = h1/G = (T_{SM}-Imin)/G.$$

As described later, the normalization constant G is greater than or equal to 255 and is determined dependently on the shift amount F.

The noise N (which will be referred to as $N_S$ hereinafter) that is generated when the input pixel value Iin falls in the range greater than or equal to the value "$(R_S+F)$–Range" and smaller than or equal to the value "$(R_S+F)$+Range" is defined by the following formula:

$$N_S = (coefficient)_S \times (rate)_S \times (random\ number)_S$$

The noise value $N_S$ can be smaller than zero (0), equal to zero, or greater than zero (0).

The value $(rate)_S$ is defined by the following formula:

$$(rate)_S = \{1-[abs(Iin-R_S-F)/Range]\}.$$

The value $(rate)_S$ becomes the maximum value (1) when the input pixel value Iin is equal to the value $(R_S+F)$, gradually decreases as the input pixel value Iin goes away from the value $(R_S+F)$, and becomes zero (0) when the input pixel value Iin reaches the value $(R_S+F)$–Range or the value $(R_S+F)$+Range.

The $(random\ number)_S$ is a white noise with no periodicity and is in a range greater than or equal to –255 and smaller than or equal to 255.

The $(coefficient)_S$ is such a value that ensures that the sum $(Iin+N_S)$ will fall in a range made up from the range H1 and the range H2, that is, in a range between the threshold $T_{NS}$ (0) and the threshold $T_{ML}$ (192). The $(coefficient)_S$ of such a value can prevent an output image from becoming rough or damaged.

It is sufficient that the sum $(Iin+N_S)$ is greater than or equal to the threshold $T_{NS}$ (0) and smaller than or equal to the threshold $T_{ML}$ (192). If the sum $(Iin+N_S)$ became smaller than the threshold $T_{NS}$ (0), the sum $(Iin'+N_S)$ of the corrected input pixel value Iin' and the noise $N_S$ will tend to become smaller than the threshold $T_{NS}$ (0) (no in S14), to generate a non-dot erroneously and to make the output image rough. Similarly, if the sum $(Iin+N_S)$ exceeded the threshold $T_{ML}$ (192), the sum $(Iin'+N_S)$ of the corrected input pixel value Iin' and the noise $N_S$ will also tend to exceed the threshold $T_{ML}$ (192) (yes in S10), to generate a large dot erroneously and to make the output image rough.

It is preferable that the sum $(Iin+N_S)$ is greater than the threshold $T_{NS}$ (0) and smaller than the threshold $T_{ML}$ (192). If the sum $(Iin+N_S)$ became equal to the threshold $T_{NS}$ (0), the sum $(Iin'+N_S)$ will also tend to become equal to the threshold $T_{NS}$ (0) (no in S14), to generate a non-dot erroneously. If the sum (Iin+$N_S$) became equal to the threshold $T_{ML}$ (192), the sum (Iin'+$N_S$) will also tend to become equal to the threshold $T_{ML}$ (192). In such a case, if the judgment process of S10 is modified to judge whether the sum (Iin'+$N_S$) is greater than or equal to the threshold $T_{ML}$ (192), a large dot will erroneously be outputted.

More specifically, the (coefficient)$_S$ has such a positive value that depends on the width h1 of the range H1 and the width h2 of the range H2 and that is defined by the following formula:

$$(\text{coefficient})_S = (\text{a smaller one of } h1 \text{ and } h2)/G$$
$$= \{\text{a smaller one of } (T_{SM} - T_{NS}) \text{ and}$$
$$(T_{ML} - T_{SM})\}/G.$$

The noise N (which will be referred to as $N_M$ hereinafter) that is generated when the input pixel value Iin falls in the range greater than or equal to the value "($R_M$+F)–Range" and smaller than or equal to the value "($R_M$+F)+Range" is defined by the following formula:

$$N_M = (\text{coefficient})_M \times (\text{rate})_M \times (\text{random number})_M$$

The noise value $N_M$ can be smaller than zero (0), equal to zero, or greater than zero (0).

The value (rate)$_M$ is defined by the following formula:

$$(\text{rate})_M = \{1 - [\text{abs}(Iin - R_M - F)/\text{Range}]\}.$$

The value (rate)$_M$ becomes the maximum value (1) when the input pixel value Iin is equal to the value ($R_M$+F), gradually decreases as the input pixel value Iin goes away from the value ($R_M$+F), and becomes zero (0) when the input pixel value Iin reaches the value ($R_M$+F)–Range or the value ($R_M$+F)+Range.

The (random number)$_M$ is a white noise with no periodicity and is in a range greater than or equal to –255 and smaller than or equal to 255.

The (coefficient)$_M$ is such a value that ensures that the sum (Iin+$N_M$) will fall in a range made up from the range H2 and the range H3, that is, in a range between the threshold $T_{SM}$ (106) and the input maximum value Imax (255). The (coefficient)$_M$ of such a value can prevent an output image from becoming rough or damaged.

It is sufficient that the sum (Iin+$N_M$) is greater than or equal to the threshold $T_{SM}$ (106) and smaller than or equal to the input maximum value Imax (255). If the sum (Iin+$N_M$) exceeded the input maximum value Imax (255), the output image will tend to become rough. If the sum (Iin+$N_M$) became smaller than the threshold $T_{SM}$ (106), the sum (Iin'+$N_M$) of the corrected input pixel value Iin' and the noise $N_M$ will also tend to become smaller than the threshold $T_{SM}$ (106) (no in S12), to generate a small-dot erroneously and to make the output image rough.

It is preferable that the sum (Iin+$N_M$) is greater than the threshold $T_{SM}$ (106). If the sum (Iin+$N_M$) became equal to the threshold $T_{SM}$ (106), the sum (Iin'+$N_M$) will also tend to become equal to the threshold $T_{SM}$ (106) (no in S12), to generate a small-dot erroneously.

More specifically, the (coefficient)$_M$ has such a positive value that depends on the width h2 of the range H2 and the width h3 of the range H3 and that is defined by the following formula:

$$(\text{coefficient})_M = (\text{a smaller one of } h2 \text{ and } h3)/G$$
$$= \{\text{a smaller one of } (T_{ML} - T_{SM}) \text{ and}$$
$$(I\max - T_{ML})\}/G.$$

The noise N (which will be referred to as $N_L$ hereinafter) that is generated when the input pixel value Iin falls in the range greater than or equal to the value "($R_L$+F)–Range" and smaller than or equal to the value "($R_L$+F)+Range" is defined by the following formula:

$$N_L = (\text{coefficient})_L \times (\text{rate})_L \times (\text{random number})_L$$

The noise value $N_L$ is smaller than or equal to zero (0).

The value (rate)$_L$ is defined by the following formula:

$$(\text{rate})_L = \{1 - [\text{abs}(Iin - R_L - F)/\text{Range}]\}.$$

The value (rate)$_L$ becomes the maximum value (1) when the input pixel value Iin is equal to the value ($R_L$+F), gradually decreases as the input pixel value Iin goes away from the value ($R_L$+F), and becomes zero (0) when the input pixel value Iin reaches the value ($R_L$+F)–Range or the value ($R_L$+F)+Range.

The (random number)$_L$ is a white noise with no periodicity and is in a range greater than or equal to –255 and smaller than or equal to zero (0).

The (coefficient)$_L$ is such a value that ensures that the sum (Iin+$N_L$) will fall in the range H3, that is, in a range between the threshold $T_{ML}$ (192) and the input maximum value Imax (255). The (coefficient)$_L$ of such a value can prevent an output image from becoming rough or damaged.

It is sufficient that the sum (Iin+$N_L$) is greater than or equal to the threshold $T_{ML}$ (192) and smaller than or equal to the input maximum value Imax (255). If the sum (Iin+$N_L$) exceeded the input maximum value Imax (255), the output image will tend to become rough. If the sum (Iin+$N_L$) became smaller than the threshold $T_{ML}$ (192), the sum (Iin'+$N_L$) of the corrected input pixel value Iin' and the noise $N_L$ will also tend to become smaller than the threshold $T_{ML}$ (192) (no in S10), to generate a medium-dot erroneously and to make the output image rough.

It is preferable that the sum (Iin+$N_L$) is greater than the threshold $T_{ML}$ (192). If the sum (Iin+$N_L$) became equal to the threshold $T_{ML}$ (192), the sum (Iin'+$N_L$) will also tend to become equal to the threshold $T_{ML}$ (192) (no in S10), to generate a medium-dot erroneously.

More specifically, the (coefficient)$_L$ has such a positive value that depends on the width h3 of the range H3 and that is defined by the following formula:

$$(\text{coefficient})_L = h3/G$$
$$= (I\max - T_{ML})\}/G.$$

Next, the normalization constant G will be described in greater detail.

The normalization constant G is a value that is greater than or equal to 255 and that depends on the shift amount F. The normalization constant G can be selected from a range greater than or equal to 256.

If the normalization constant G is set to equal to 255 and if the shift amount F is other than zero (0), the value (Iin+$N_N$) will possibly become smaller than the input minimum value Imin (0) or will possibly exceed the threshold $T_{SM}$ (106), the value (Iin+$N_S$) will possibly become smaller than the threshold $T_{NS}$ (0) or will possibly exceed the threshold $T_{ML}$ (192), the value (Iin+$N_M$) will possibly become smaller than the threshold $T_{SM}$ (106) or will possibly exceed the input maximum value Imax (255), and the value (Iin+$N_L$) will possibly be smaller than the threshold $T_{ML}$ (192) or will possibly exceed the input maximum value Imax (255). This will possibly make an output image become rough and damaged.

It is noted that if the shift amount F is equal to zero (0), the normalization constant G may be set equal to 255. In such a case, however, the value (Iin+$N_N$) will possibly become equal to the threshold $T_{SM}$ (106), the value (Iin+$N_S$) will possibly become equal to the threshold $T_{NS}$ (0) and the threshold $T_{ML}$ (192), the value (Iin+$N_M$) will possibly become equal to the threshold $T_{SM}$ (106), and the value (Iin+$N_L$) will possibly become equal to the threshold $T_{ML}$ (192).

The present inventor performed an experiment to confirm that the an optimum value for the normalization constant G is 291 with respect to a combination of the shift amount F of two (2) and the input pixel value range of 0 to 255. By setting the normalization constant G to 291, it is ensured that the value (Iin+$N_N$) becomes greater than or equal to the input minimum value Imin (0) and smaller than the threshold $T_{SM}$ (106), that the value (Iin+$N_S$) becomes greater than the threshold $T_{NS}$ (0) and smaller than the threshold $T_{ML}$ (192), that the value (Iin+$N_M$) becomes greater than the threshold $T_{SM}$ (106) and smaller than the input maximum value Imax (255), and that the value (Iin+$N_L$) becomes greater than the threshold $T_{ML}$ (192) and smaller than or equal to the input maximum value Imax (255).

It is noted that there is a case where a false edge will possibly occur when the input pixel value Iin is equal to either one of one through three values among the four values ($R_N$+F), ($R_S$+F), ($R_M$+F), ($R_L$+F). In such a case, noise may be generated only when the input pixel value Iin is around the subject one to three values.

For example, if it is suspected that a false edge will possibly occur in a cyan positive gradation image at such a position where the input pixel value Iin is near to the value 108 (=$R_S$+2) or the value 194 (=$R_M$+2), the CPU 10 may generate noise only when the input pixel value Iin is around 108 or 194. In other words, the CPU 10 may generate the noise values $N_S$ and $N_M$ in a manner described above, while setting the noise values $N_N$ and $N_L$ compulsively to zero (0).

As described above, according to the present embodiment, if a false edge will possibly occur at a portion in an image where the input pixel value Iin is equal to the value ($R_j$+F), where j=N, S, M, or L, the noise value N is generated when the input pixel value Iin is around the value ($R_j$+F). The noise value N has a value equal to a product of a random number, the value "rate", and the value "coefficient". The value "rate" becomes the maximum value (1) when the input pixel value Iin is equal to the value ($R_j$+F), and becomes zero (0) when the input pixel value Iin is smaller than or equal to the value ($R_j$+F)−Range and when the input pixel value Iin is greater than or equal to the value ($R_j$+F)+Range. The value "coefficient" ensures that the value (Iin+N) will not become smaller than the input minimum value Imin or a threshold (lower next threshold) that corresponds to another relative value (lower next relative value) that is smaller than and next to the subject relative value $R_j$ and will not exceed the input maximum value Imax or another threshold (higher next threshold) that corresponds to still another relative value (higher next relative value) that is greater than and next to the subject relative value $R_j$.

For example, if a false edge will possibly occur at a portion in an image where the input pixel value Iin is around 106 (=$R_S$(=106)+F(=0)), which is equal to the relative value $R_S$ (106), the noise value $N_S$ is generated when the input pixel value Iin is around the relative value $R_S$ (106). The noise value $N_S$ has a value equal to a product of a random number, the value (rate)$_S$, and the value (coefficient)$_S$. The value (rate)$_S$ becomes the maximum value (1) when the input pixel value Iin is equal to the subject relative value $R_S$ (106), and becomes zero (0) when the input pixel value Iin is smaller than or equal to the value "$R_S$(106)+F(0)−Range" and when the input pixel value Iin is greater than or equal to the value "$R_S$(106)+F(0)−Range". The value (coefficient)$_S$ ensures that the value (Iin+$N_S$) will not become smaller than the input minimum value Imin or the threshold $T_{NS}$ (0) that corresponds to the relative value $R_N$ (0) that is smaller than and next to the subject relative value $R_S$ (106) among the four relative values $R_N$ (0), $R_S$ (106), $R_M$ (192), and $R_L$ (255), and that the value (Iin+$N_S$) will not exceed the input maximum value Imax or the threshold $T_{ML}$ (192) that corresponds to the relative value $R_M$ (192) that is greater than and next to the subject relative value $R_S$ (106) among the four relative values $R_N$ (0), $R_S$ (106), $R_M$ (192), and $R_L$ (255).

Or, if a false edge will possibly occur at a portion in an image where the input pixel value Iin is around 108 (=$R_S$(=106)+F(=2)), which is adjacent to the relative value $R_S$ (106), the noise value $N_S$ is generated when the input pixel value Iin is around the value (108). The noise value $N_S$ has a value equal to a product of a random number, the value (rate)$_S$, and the value (coefficient)$_S$. The value (rate)$_S$ becomes the maximum value (1) when the input pixel value Iin is equal to the value "$R_S$(106)+F(2)", which is adjacent to the relative value $R_S$ (106), and becomes zero (0) when the input pixel value Iin is smaller than or equal to the value "$R_S$(106)+F(2)−Range" and when the input pixel value Iin is greater than or equal to the value "$R_S$(106)+F(2)+Range". The value (coefficient)$_S$ ensures that the value (Iin+$N_S$) will not become smaller than the input minimum value Imin or the threshold $T_{NS}$ (0) that corresponds to the relative value $R_N$ (0) that is smaller than and next to the subject relative value $R_S$ (106) and will not exceed the input maximum value Imax or the threshold $T_{ML}$ (192) that corresponds to the relative value $R_M$ (192) that is greater than and next to the subject relative value $R_S$ (106).

In other words, the noise N is generated when the input pixel value Iin is around a false-edge generating density value. One relative value (nearest relative value) is the nearest to the input pixel value Iin among all of the four relative values. The noise has the value N equal to a product of a random number, the value (rate), and the value (coefficient). The value (rate) becomes the maximum value (1) when the input pixel value Iin is equal to the false-edge generating density value, and becomes zero (0) when the input pixel value Iin is smaller than or equal to the value "(false-edge generating density value)−Range" and when the input pixel value Iin is greater than or equal to the value "(false-edge generating density value)+Range". The value (coefficient) ensures that the value (Iin+N) will not become smaller than the input minimum value Imin or a lower threshold that corresponds to: a lower relative value that is smaller than and next to the nearest relative value and will not exceed the input maximum value Imax or a higher threshold that corresponds to a higher relative value that is greater than and next to the nearest relative value.

In other words, the noise value $N_N$, which is generated when the input pixel value Iin falls in the range of ($R_N$+F)−Range≦Iin≦($R_N$+F)+Range along the horizontal direction, falls in a range of $(h1/G) \times (Rate)_N \times 0$ to $(h1/G) \times (Rate)_N \times 255$ along the vertical direction. The noise value $N_S$, which is generated when the input pixel value Iin falls in the range of $(R_S+F)-\text{Range} \leq \text{Iin} \leq (R_S+F)+\text{Range}$ along the horizontal direction, falls in a range of {(the smaller one of h1 and h2)/G}$\times (Rate)_S \times (-255)$ to ((the smaller one of h1 and h2)/G}$\times (Rate)_S \times 255$ along the vertical direction. The noise value $N_M$, which is generated when the input pixel value Iin falls in the range of $(R_M+F)-\text{Range} \leq \text{Iin} \leq (R_M+F)+\text{Range}$ in the horizontal direction, falls in a range of {(the smaller one of h2 and h3)/G}$\times (Rate)_M \times (-255)$ to {(the smaller one of h2 and h3)/G}$\times (Rate)_M \times 255$ along the vertical direction. The noise value $N_L$, which is generated when the input pixel value Iin falls in the range of $(R_L+F)-\text{Range} \leq \text{Iin} \leq (R_L+F)+\text{Range}$ in the horizontal direction, falls in a range of $(h3/G) \times (Rate)_L \times (-255)$ to $(h3/G) \times (Rate)_L \times 0$ in the vertical direction.

Each (Rate)$_j$ (where j=N, S, M, or L) becomes maximum when the input pixel value Iin is equal to the value $(R_j+F)$ (where j=N, S, M, or L) and decreases as the input pixel value Iin goes away from the value $(R_j+F)$. Accordingly, the noise value $N_j$ (where j=N, S, M, or L) falls in the range indicated as the hatched or shaded portion in FIG. 8, whose width along the vertical direction becomes maximum when the input pixel value Iin is equal to the value $(R_j+F)$ and decreases as the input pixel value Iin moves away from the value $(R_j+F)$. Accordingly, the possible maximum value, which the absolute value of the noise value $N_j$ (where j=N, S, M, or L) will possibly become, becomes maximum when the input pixel value Iin is equal to the value $(R_j+F)$ and decreases as the input pixel value moves away from the value $(R_j+F)$. For example, the possible maximum value, which the absolute value of the noise value $N_N$ will possibly become, has the value of $(h1/G) \times (Rate)_N \times 255$, which becomes maximum when the input pixel value Iin is equal to the value $(R_N+F)$ and decreases as the input pixel value moves away from the value $(R_N+F)$. The possible maximum value, which the absolute value of the noise value $N_S$ will possibly become, has the value of {(the smaller one of h1 and h2)/G}$\times (Rate)_S \times 255$, which becomes maximum when the input pixel value Iin is equal to the value $(R_S+F)$ and decreases as the input pixel value moves away from the value $(R_S+F)$. The possible maximum value, which the absolute value of the noise value $N_M$ will possibly become, has the value of {(the smaller one of h2 and h3)/G}$\times (Rate)_M \times 255$, which becomes maximum when the input pixel value Iin is equal to the value $(R_M+F)$ and decreases as the input pixel value moves away from the value $(R_M+F)$ The possible maximum value, which the absolute value of the noise value $N_L$ will possibly become, has the value of $(h3/G) \times (Rate)_L \times (255)$, which becomes maximum when the input pixel value Iin is equal to the value $(R_L+F)$ and decreases as the input pixel value moves away from the value $(R_L+F)$.

The present inventor executed an experiment in a manner described below.

Figure 9A:
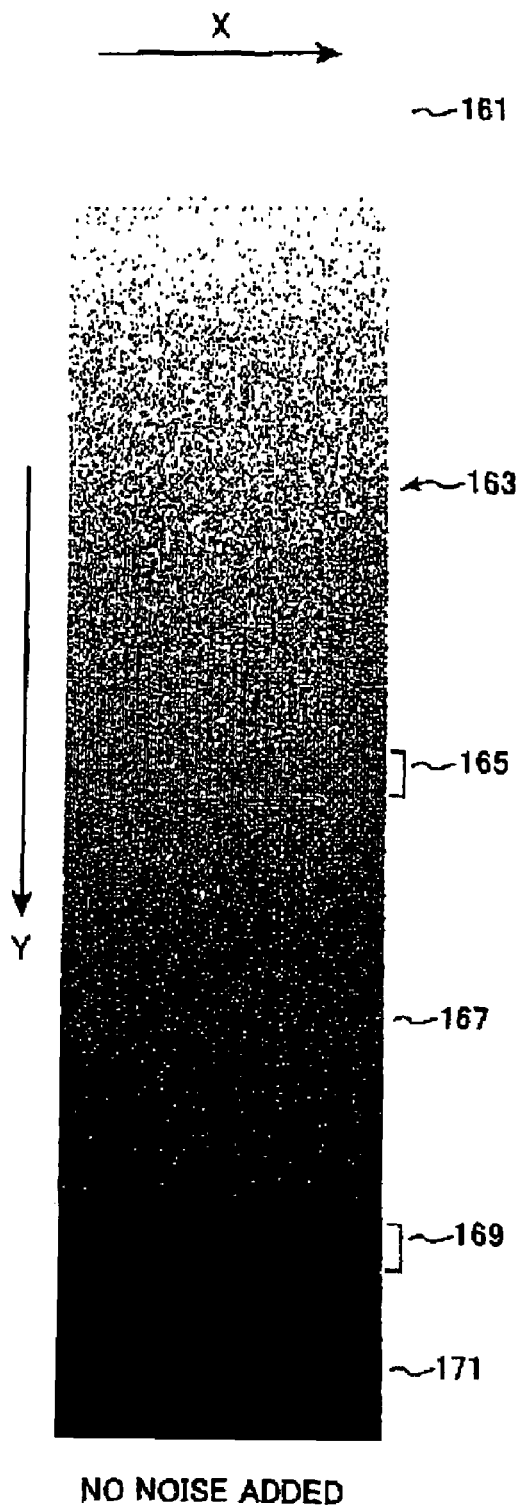
FIG. 9(a) shows a printed image obtained through a comparative method.
Figure 9B:
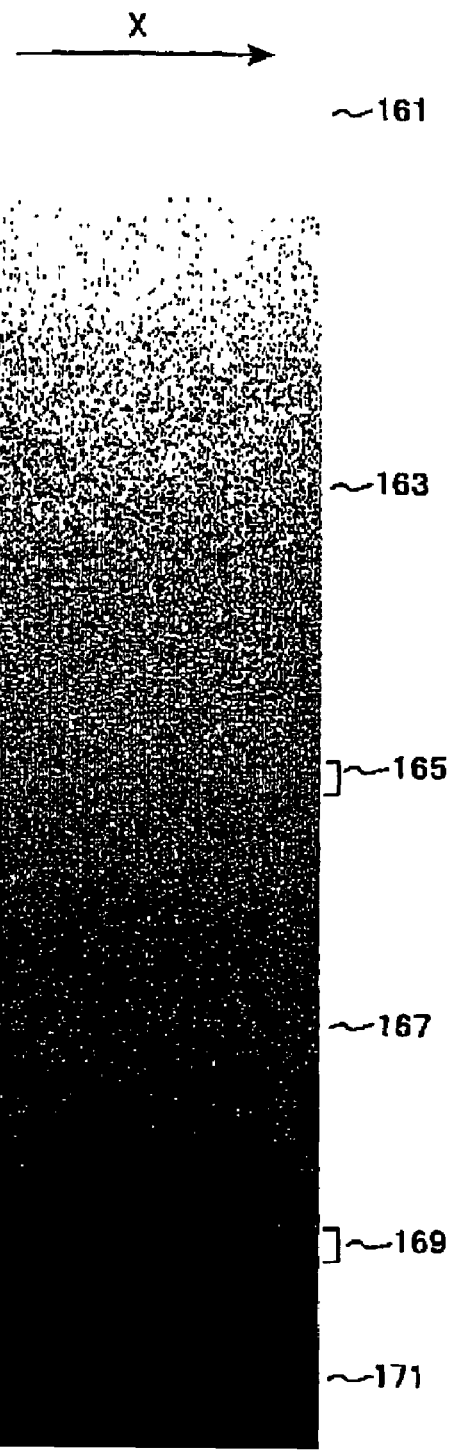
FIG. 9(b) shows a printed image obtained through the method of the embodiment.

A cyan positive gradation image was processed according to the multi-value error distribution processing of the present embodiment, and a resultant output image was printed by the printer 5. This original positive gradation image was such a gradation image whose density (input pixel value Iin) gradually increased from the printing position Y to the printing position Y=355 in the Y direction. One X-directional line located in each printing position Y had a plurality of pixels (0, Y) to (Xmax,Y), whose densities (input pixel values Iin) were equal to one another. Around printing position Y=0, the input pixel values Iin were zero. Around printing position Y=170, the input pixel values Iin were equal to the small-dot relative value $R_S$ (106). Around printing position Y=310, the input pixel values Iin were equal to the medium-dot relative value $R_M$ (192). Around printing position Y=355, the input pixel values Iin were equal to 255. During this experiment, the noise values $N_S$ and $N_M$ were added when the input density value Iin was around the value $(R_S+F)$ or the value $(R_M+F)$ It is noted that the shift amount F was set to two (2), the value "Range" was set to ten (10), and the normalization constant G was set to 291. Accordingly, the (coefficient)$_S$ was set to 86/291, and the (coefficient)$_M$ was set to 63/291. The noise values $N_N$ and $N_L$ were set compulsively to zero (0) FIG. 9(b) shows the resultant, printed output image obtained by the multi-value error distribution processing of the present embodiment.

The present inventor also executed a comparative experiment. During this comparative experiment, a cyan positive gradation image the same as that used in the above-described experiment was processed according to a comparative multi-value error distribution processing, which is the same as the multi-value error distribution processing of the present embodiment except that no noises were added. That is, all the noise values $N_N$, $N_S$, $N_M$, and $N_L$ were set compulsively to zero (0). FIG. 9(a) shows a resultant, printed output image obtained by the comparative multi-value error distribution processing.

FIG. 10(a) briefly illustrates various areas in the printed image in FIG. 9(a). FIG. 10(b) briefly illustrates various areas in the printed image in FIG. 9(b).

As shown in FIGS. 10(a) and 10(b), each printed mage has regions 161, 163, 165, 167, 169, and 171, which are arranged in this order along the Y direction. The region 161 is formed from non-dots only. The region 163 is formed from a mixture of non-dots and small dots. The region 165 is a solid region formed from small dots only. The region 167 is formed from a mixture of small dots and medium dots. The region 169 is another solid region formed from medium dots only. The region 171 is formed from a mixture of medium dots and large dots.

False edges occur at the boundary between the regions 163 and 165, at the boundary between the regions 165 and 167, at the boundary between the regions 167 and 169, and at the boundary between the regions 169 and 171. As apparent from FIGS. 9(a), 9(b), 10(a), and 10(b), it is confirmed that when no noises are added, as clearly understood from FIGS. 9(a) and 10(a), the regions 165 and 169 become wide and the false edges appear clearly. Contrarily, when noises are added, as clearly understood from FIGS. 9(b) and 10(b), the widths of the regions 165 and 169 decrease and the false edges become less defined.

Figure 11:
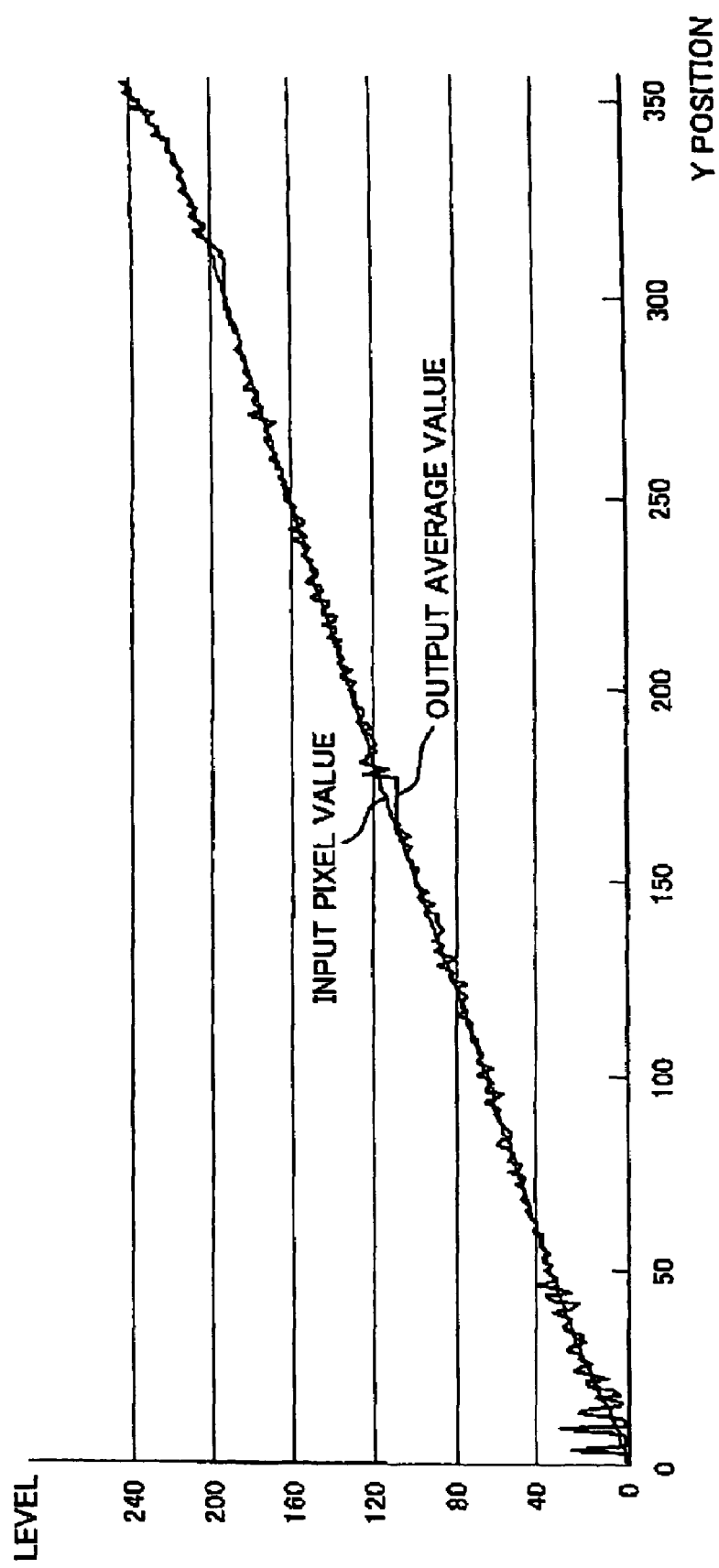
FIG. 11 is a graph showing a relationship between the input pixel value and the output average value at each print position according to the comparative method.

FIG. 11 relates to the comparative multi-value error distribution processing that produced the output image shown in FIGS. 9(a) and 10(a). The horizontal axis represents the Y positions, while the vertical axis represents the density level in the range of 0 to 255. The input density value Iin of the input image is indicated by a thin line, while an output average value of the output image is indicated by a bold line. The output average value at each Y position was determined in a manner described below, That is, after determining output pixel values Iout at all the pixels in the X-directional line at each Y position and determining relative values for the output pixel values Iout, the output average value at the subject Y position was determined by calculating an average of the relative values. FIG. 11 therefore illustrates how the input density value Iin changes according to the Y position in the original cyan positive gradation image and how the output average value obtained through the comparative multi-value error distribution processing changes according to the Y position.

Figure 12:
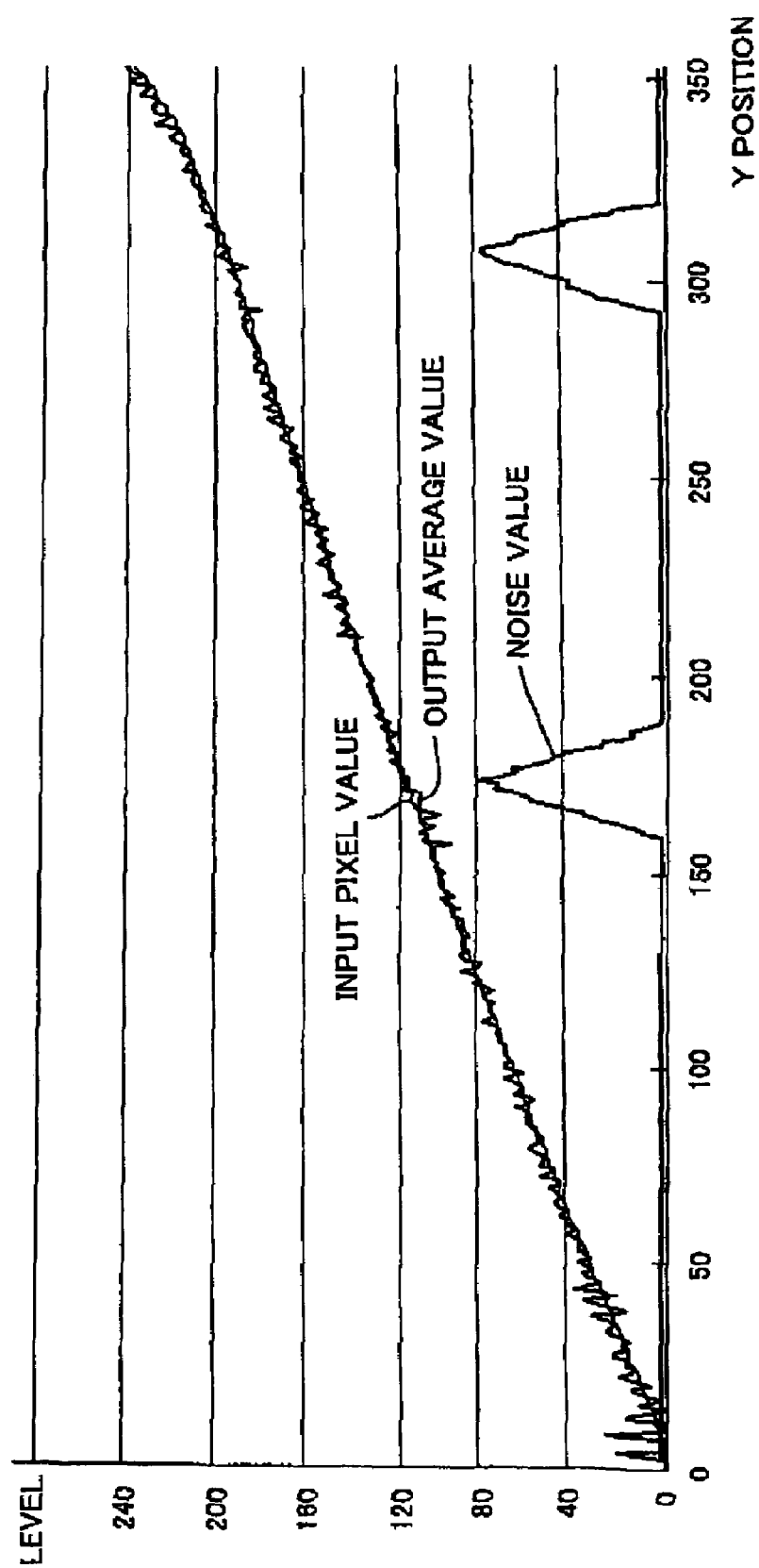
FIG. 12 is a graph showing a relationship between the input pixel value and the output average value at each print position according to the method of the embodiment.

FIG. 12 relates to the multi-value error distribution processing of the present embodiment that produced the output image shown in FIGS. 9(b) and 10(b). Similarly to FIG. 11, the horizontal axis represents the Y positions, while the vertical axis represents the density level in the range of 0 to 255. The input density value Iin is indicated by a thin line, while the output average value is indicated by a bold line. The levels of the noises $N_S$ and $N_M$, which were added at positions around the Y positions of 170 and 310, where the input pixel value Iin was around the value $(R_S+F)$ and $(R_M+F)$, are also shown in FIG. 12. FIG. 12 therefore illustrates how the input density value changes according to the Y position in the original cyan positive gradation image, how the added noise level changes according to the Y position, and how the output average value obtained through the multi-value error distribution processing according to the present embodiment changes according to the Y position.

It is apparent from FIG. 11 that around the Y positions of 170 and 310, the bold line for the output average value extends horizontally and separates from the input pixel value. It is noted that substantially at the central location in each region where the bold line for the output average value extends horizontally, the input pixel value Iin is equal to the corresponding value $(R_S+F)$ or $(R_M+F)$, wherein F=2. It is therefore known that a false edge occurs around the Y position of 170, where the input density value Iin is around the value $(R_S+F)$ and that a false edge occurs also around the Y position of 310, where the input density value Iin is around the value $(R_M+F)$.

As apparent from FIG. 12, according to the present embodiment, the level of the noise becomes the highest peak substantially at the central location in each region where the bold line for the output average value extends horizontally in FIG. 11, that is, when the input pixel value is equal to the value $(R_S+F)$ or $(R_M+F)$. By adding the noise according to the present embodiment, the output average value line (bold line) becomes not to extend horizontally around the Y position of 170 or 310, but gradually increases along with the input density value. Accordingly, the false edges are diminished.

According to the above-described experiments, it is confirmed that by setting the shift amount F to two (2), by setting the "Range" to ten (10), and by setting the normalization constant G to 291, it is ensured that a sum of the input pixel value Iin around the relative value $R_S$ and the noise value $N_S$ does not exceed the threshold $T_{ML}$ (192) corresponding to the relative value $R_M$ (192) and does not become smaller than the threshold $T_{NS}$ (0) corresponding to the relative value $R_N$ (0) and that a sum of the input pixel value Iin around the relative value $R_M$ and the noise value $N_M$ does not exceed the input maximum value Imax (255) and does not become smaller than the threshold $T_{SM}$ (106) corresponding to the relative value $R_S$ (106), thereby preventing the output image from becoming rough and diminishing the false edge.

The present inventor further performed additional experiments to add noises when input pixel values were around the relative value $R_L$ for the cyan-ink large dot and when input pixel values were for other colors of black, magenta, and yellow. It is confirmed that advantages were obtained in the same manner as when noises were added when the input pixel values were around the relative values $R_S$ and $R_M$ for the cyan-ink small and medium dots as described above.

It is noted that if a too large amount of noise value N were added to the input pixel value Iin, which is around the value $(R_j+F)$, where j=N, S, M, or L, the value (Iin+N) will possibly become smaller than the input minimum value Imin or the lower next threshold that corresponds to the lower next relative value that is smaller than and next to the subject relative value $R_j$ and will possibly exceed the input maximum value Imax or the higher next threshold that corresponds to the higher next relative value that is greater than and next to the subject relative value $R_j$. This will possibly damage an output image and a false edge will possibly occur.

Figure 13:
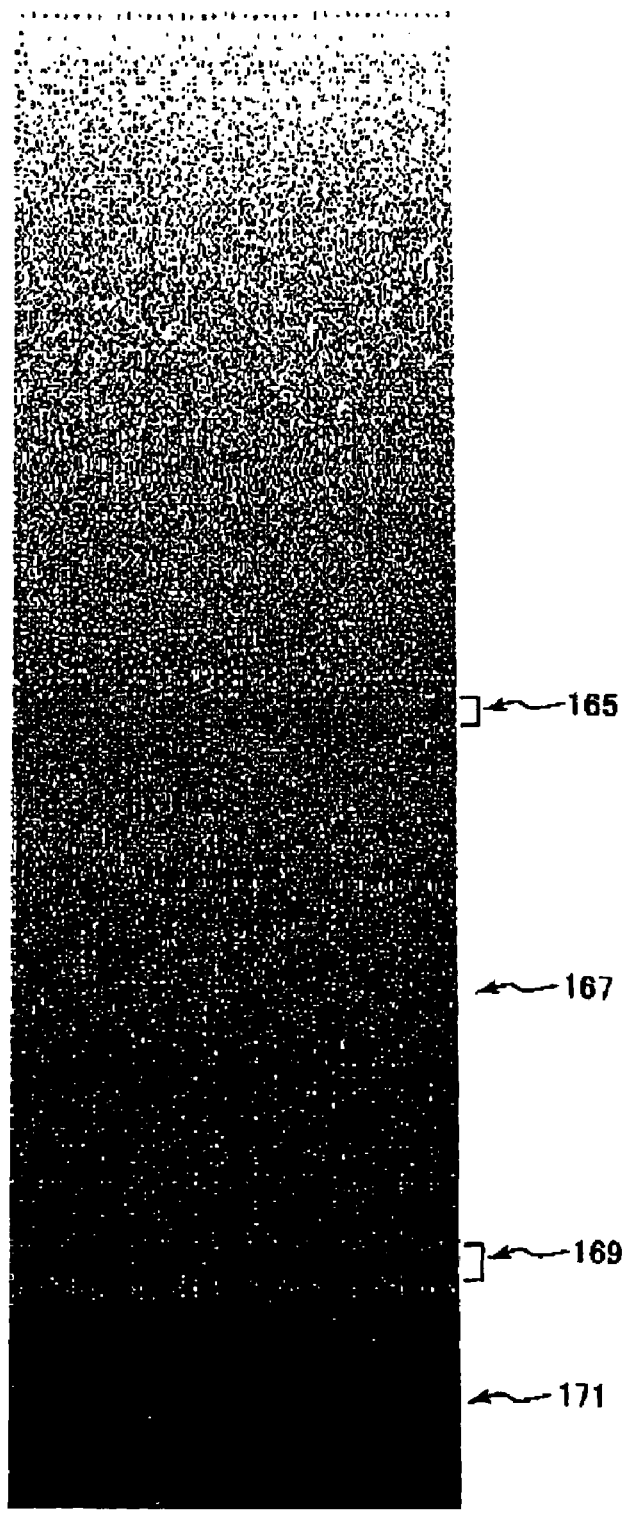
FIG. 13 shows a printed image obtained when an excessive noise is added.

The present inventor executed another comparative experiment onto a cyan positive gradation image that is the same as that used in the above-described experiments. The cyan positive gradation image was processed according to another comparative multi-value error distribution processing, which is the same as the multi-value error distribution processing of the present embodiment except that the values (coefficient)$_S$ and the (coefficient)$_M$ of the noise values $N_S$ and $N_M$ were set equal to 0.5 and the noise values $N_N$ and $N_L$ were set compulsively to zero (0). A resultant output image was printed as shown in FIG. 13. Large dots and non-dots were erroneously generated in a part of the area 167 that is located next to the area 165, although the area 167 should be made by the mixture of small dots and medium dots only. Non-dots were erroneously generated in a part of the area 171 that is located next to the area 169, although the area 171 should be made by the mixture of medium dots and large dots only. Thus, the output image became rough and false edges appeared clearly.

While the invention has been described in detail with reference to the specific embodiment thereof, it would be apparent to those skilled in the art that various changes and modifications may be made therein without departing from the spirit of the invention.

For example, in the above-described embodiment, in the noise value adding process 104, the corrected input pixel value Iin' is added with the noise value. N, and in the comparing process 105, the added result (Iin'+N) is compared with the thresholds $T_{NS}$, $T_{SM}$, and $T_{ML}$. However, as shown in FIG. 14, a noise value subtracting process 115 may be executed instead of executing the noise value adding process 104. In the noise value subtracting process 115, the CPU 10 subtracts the noise N from the thresholds $T_{NS}$, $T_{SM}$, and $T_{ML}$. In this case, in the comparing process 105, the CPU 10 compares the corrected input pixel value Iin' with the subtracted results $(T_{NS}-N)$, $(T_{SM}-N)$, and $(T_{ML}-N)$. More specifically, it is judged in S10 (FIG. 7) whether or not the value Iin' is greater than the value $(T_{ML}-N)$. It is judged in S12 whether or not the value Iin' is greater than the value $(T_{SM}-N)$. It is judged in S14 whether or not the value Iin' is greater than the value $(T_{NS}-N)$. This is because the inequality of (corrected input pixel value)+(noise value)>(threshold) is equivalent to the inequality of (corrected input pixel value)>(threshold)−(noise value).

The value "rate" may not be defined by the formula (1) if the value "rate" becomes the maximum of one (1) when the input pixel value Iin is equal to the value $(R_j+F)$, where j=N, S, M, or L and the value "rate" gradually decreases as the input pixel value Iin moves away from the value $(R_j+F)$ and the value "rate" becomes equal to zero (0) when the input pixel value Iin is less than or equal to the value $(R_j+F)$−Range and is greater than or equal to the value $(R_j+F)$+Range. For example, the value "rate" may become the maximum when the input pixel value Iin is equal to the value $(R_j+F)$ and gradually decrease in a Gaussian curve as the input pixel value Iin moves away from the value $(R_j+F)$.

In the embodiment, the random number in the range of −255 to +255 is generated when the input density value is within the region $D_S$ or $D_M$. However, a random number in a range greater than or equal to 0 and smaller than or equal to +255 or a random number in a range of greater than or equal to −255 and smaller than or equal to 0 may be generated even when the input density value is within the region $D_S$ or $D_M$.

In the embodiment, in the noise generating process 101, the CPU 10 calculates the rate and the coefficient with respect to the input pixel value Iin, generates a random number, and determines a noise value as a product of the random number, the rate, and the coefficient. However, the CPU 10 may determine a range in which the noise value falls, by calculating the rate and the coefficient, and by multiplying a product of the rate and the coefficient by the maximum value and the minimum value of the random number generating range. In this case, the range in which the noise value falls will become the same as the range indicated as the hatched or shaded portion in FIG. 8. Thereafter, the noise value is generated within the determined range.

In the above-described embodiment, the input pixel value Iin is represented by eight bits and is either one value in a range of 0 to 255. However, the input pixel value Iin may be represented by sixteen bits and may be either one value falling in a range of 0 to 65,535.

In the above-described embodiment, the threshold values $T_{NS}$, $T_{SM}$, and $T_{ML}$ are equal to the corresponding relative values $R_N$, $R_S$, $R_M$, respectively. However, the threshold values $T_{NS}$, $T_{SM}$, and $T_{ML}$ may differ from the corresponding relative values $R_N$, $R_S$, $R_M$. More specifically, the threshold values $T_{NS}$, $T_{SM}$, and $T_{ML}$ may be shifted from the corresponding relative values $R_N$, $R_S$, $R_M$, respectively, by an amount in the range of about −1% to about +1% of the range of the input pixel values. For example, when the input pixel value is represented by eight bits and therefore ranges from 0 to 255, the threshold values $T_{NS}$, $T_{SM}$, and $T_{ML}$ may be shifted from the corresponding relative values $R_N$, $R_S$, $R_M$, respectively, by an amount in the range of about −2.56 to about +2.56. When the input pixel value is represented by sixteen bits and therefore ranges from 0 to 65,535, the threshold values $T_{NS}$, $T_{SM}$, and $T_{ML}$ may be shifted from the corresponding relative values $R_N$, $R_S$, $R_M$, respectively, by an amount in the range of about −655.35 to about +655.35.

In the embodiment, for each color, an input pixel value in for each pixel, which is either one of 256 different values in the range of 0 to 255, is subjected to the multi-value error distribution processing of the present embodiment to be converted into an output pixel value Iout, which is either one of four different values. However, the multi-value error distribution processing of the present embodiment may be modified to convert an m-tone input pixel value Iin, which is either one of "m" number of different values (where m is greater than or equal to four (4)), into an n-tone output pixel value Iout, which is either one of "n" number of different values (where n is smaller than m and is greater than or equal to three (3)), by using the (n−1) number of different thresholds.

Additionally, the multi-value error distribution processing of the present embodiment may be modified into a two-value error distribution processing to convert the p-tone input pixel value Iin, which is either one of "p" number of different values (where p is greater than or equal to three (3)), into a two-tone output pixel value Iout, which is either one of two different values, by using one threshold only.

In the embodiment, the multi-value error distribution processing program 29, the threshold table 30, the relative value table 32, and the distribution matrix 34 are stored in the hard disk (HD) 16. However, the multi-value error distribution processing program 29, the threshold table 30, the relative value table 32, and the distribution matrix 34 may be stored in the ROM 12, instead. Or, the multi-value error distribution processing program 29, the threshold table 30, the relative value table 32, and the distribution matrix 34 may be originally stored in a CD-ROM (not shown) and be supplied to the image processing device 1 via the CD-ROM drive 19.

The multi-value error distribution processing program 29 may be stored in various types of storage media that are readable by a computer. The image processing device 1 may be provided with a drive for reading the multi-value error distribution processing program from these various types of storage media. Or, the multi-value error distribution processing program 29 may be downloaded from a network such as the Internet to the image processing device 1.

The image processing device according to the embodiment may be other than a computer, but may include components that attain the multi-value error distribution processing of the present embodiment.

The multi-value error distribution processing program 29 may be installed in the ROM 54 in the printer 5. In this example, the image processing device 1 supplies the 256 tone image data Iin as it is to the printer 5. The printer 5 executes the multi-value error distribution processing program 29 to convert the 256 tone image data Iin into four tone image data Iout.

What is claimed is:

1. An image processing device, comprising:

an input portion receiving an input pixel value for one pixel, the input pixel value indicating either one of a first predetermined number of different first tone levels, the first predetermined number being greater than or equal to three;

an input pixel value correcting portion that corrects the input pixel value for the pixel based on errors that have been generated at already-processed pixels, thereby determining a corrected input pixel value;

a noise providing portion that provides a noise to either one of the corrected input pixel value and at least one threshold by executing either one of a noise value adding process and a noise value subtracting process, the noise value adding process adding a noise value to the corrected input pixel value, the noise value subtracting process subtracting the noise value from the at least one threshold;

an output portion that compares a noise-value-added corrected input pixel value with at least one of the at least one threshold when the corrected input pixel value is added with the noise value and that compares the corrected input pixel value with at least one noise-value-subtracted threshold when the noise value is subtracted from the at least one threshold, thereby outputting an output pixel value based on a compared result, the output pixel value indicating either one of a second predetermined number of different second tone levels, the second predetermined number being smaller than the first predetermined number but being greater than one; and an error calculating portion that calculates a difference between the corrected input pixel value and a relative value corresponding to the output pixel value, the relative value being either one of a plurality of relative values that correspond to the second predetermined number of different second tone levels, the noise providing portion providing the noise to the either one of the corrected input pixel value and the at least one threshold when the input pixel value is equal to at least one of the plurality of relative values and at least one adjacent value that is adjacent to at least one of the relative values.

2. An image processing device as claimed in claim 1, wherein the noise providing portion sets the noise value to allow a sum of the noise value and the input pixel value to be greater than or equal to a lower next threshold when the at least one threshold includes the lower next threshold, the lower next threshold corresponding to a lower next relative value that is lower than and next to at least one of the relative values, and wherein the noise providing portion sets the noise value to allow a sum of the noise value and the input pixel value to be smaller than or equal to a higher next threshold when the at least one threshold includes the higher next threshold, the higher next threshold corresponding to a higher next relative value that is higher than and next to at least one of the relative values.

3. An image processing device as claimed in claim 1, wherein each of the at least one threshold is substantially equal to a corresponding relative value.

4. An image processing device as claimed in claim 1, wherein the noise providing portion provides the noise to the either one of the corrected input pixel value and the at least one threshold when the input pixel value is equal to either one of all the relative values and adjacent values adjacent to all the relative values.

5. An image processing device as claimed in claim 1, wherein the noise providing portion sets the noise value to allow a sum of the noise value and the input pixel value to be greater than or equal to a minimum value among the first predetermined number of first tone levels and to be smaller than or equal to a maximum value among the first predetermined number of first tone levels.

6. An image processing device as claimed in claim 1, wherein a possible maximum value, which an absolute value of the noise value will possibly become, becomes maximum when the input pixel value is equal to the either one of at least one of the relative values or the one adjacent value and decreases as the input pixel value moves away from the either one of the at least one of the relative values and the one adjacent value.

7. An image processing device as claimed in claim 1, wherein the noise providing portion sets the noise value dependently on the input pixel value.

8. An image processing device as claimed in claim 1, wherein:
the noise providing portion sets the noise value dependently on the input pixel value and a lower next threshold when the at least one threshold includes the lower next threshold, the lower next threshold corresponding to a lower next relative value that is lower than and next to the one relative value, and the noise providing portion sets the noise value dependently on the input pixel value and a higher next threshold when the at least one threshold includes the higher next threshold, the higher next threshold corresponding to a higher next relative value that is higher than and next to the one relative value.

9. An image processing device, comprising:
an input portion receiving an input pixel value for one pixel, the input pixel value indicating either one of a first predetermined number of different first tone levels, the first predetermined number being greater than or equal to three;

an input pixel value correcting portion that corrects the input pixel value for the pixel based on errors that have been generated at already-processed pixels, thereby determining a corrected input pixel value;

a noise providing portion that provides a noise to either one of the corrected input pixel value and at least one threshold by executing either one of a noise value adding process and a noise value subtracting process, the noise value adding process adding a noise value to the corrected input pixel value, the noise value subtracting process subtracting the noise value from the at least one threshold;

an output portion that compares a noise-value-added corrected input pixel value with at least one of the at least one threshold when the corrected input pixel value is added with the noise value and that compares the corrected input pixel value with at least one noise-value-subtracted threshold when the noise value is subtracted from the at least one threshold, thereby outputting an output pixel value based on a compared result, the output pixel value indicating either one of a second predetermined number of different second tone levels, the second predetermined number being smaller than the first predetermined number but being greater than one; and an error calculating portion that calculates a difference between the corrected input pixel value and a relative value corresponding to the output pixel value, the relative value being either one of a plurality of relative values that correspond to the second predetermined number of different second tone levels, the noise providing portion providing the noise to the either one of the corrected input pixel value and the at least one threshold when the input pixel value is equal to at least one of the plurality of relative values and at least one shifted value that is shifted from at least one of the relative values by a predetermined amount, the noise providing portion setting the noise value to allow a sum of the noise value and the input pixel value to be greater than or equal to a lower next threshold when the at least one threshold includes the lower next threshold, the lower next threshold corresponding to a lower next relative value that is lower than and next to the at least one of the relative values, and the noise providing portion setting the noise value to allow a sum of the noise value and the input pixel value to be smaller than or equal to a higher next threshold when the at least one threshold includes the higher next threshold, the higher next threshold corresponding to a higher next relative value that is higher than and next to at least one of the relative values.

10. An image processing device as claimed in claim 9, wherein each of the at least one threshold is substantially equal to a corresponding relative value.

11. An image processing device as claimed in claim 9, wherein the noise providing portion provides the noise to the either one of the corrected input pixel value and the at least one threshold when the input pixel value is within a range that includes one of the at least one of the relative values and the one shifted value.

12. An image processing device as claimed in claim 9, wherein a possible maximum value, which an absolute value of the noise value will possibly become, becomes maximum when the input pixel value is equal to the either one of at least one of the relative values and the one shifted value and decreases as the input pixel value moves away from the one of the at least one of the relative values and the one shifted value.

13. An image processing device, comprising:
an input portion receiving an input pixel value for one pixel, the input pixel value indicating either one of a first predetermined number of different first tone levels, the first predetermined number being greater than or equal to three;

an input pixel value correcting portion that corrects the input pixel value for the pixel based on errors that have been generated at already-processed pixels, thereby determining a corrected input pixel value;

a noise providing portion that provides a noise to either one of the corrected input pixel value and at least one threshold by executing either one of a noise value adding process and a noise value subtracting process, the noise value adding process adding a noise value to the corrected input pixel value, the noise value subtracting process subtracting the noise value from the at least one threshold;

an output portion that compares a noise-value-added corrected input pixel value with at least one of the at least one threshold when the corrected input pixel value is added with the noise value and that compares the corrected input pixel value with at least one noise-value-subtracted threshold when the noise value is subtracted from the at least one threshold, thereby outputting an output pixel value based on a compared result, the output pixel value indicating one of a second predetermined number of different second tone levels, the second predetermined number being smaller than the first predetermined number but being greater than one; and an error calculating portion that calculates a difference between the corrected input pixel value and a relative value corresponding to the output pixel value, the relative value being either one of a plurality of relative values that correspond to the second predetermined number of different second tone levels, the noise providing portion setting the noise value to allow a sum of the noise value and the input pixel value to be greater than or equal to a lower next-to-nearest threshold when the at least one threshold includes the lower next-to-nearest threshold, the lower next-to-nearest threshold corresponding to a lower next-to-nearest relative value that is lower than and next to a nearest relative value that is the nearest to the input pixel value among the plurality of relative values, and the noise providing portion setting the noise value to allow the sum of the noise value and the input pixel value to be smaller than or equal to a higher next-to-nearest threshold when the at least one threshold includes the higher next-to-nearest threshold, the higher next-to-nearest threshold corresponding to a higher next-to-nearest relative value that is higher than and next to the nearest relative.

14. An image processing device as claimed in claim 13, wherein the noise providing portion sets the noise value to allow the sum of the noise value and the input pixel value to be greater than the lower next-to-nearest threshold when the at least one threshold includes the lower next-to-nearest threshold, and wherein the noise providing portion sets the noise value to allow the sum of the noise value and the input pixel value to be smaller than the higher next-to-nearest threshold when the at least one threshold includes the higher next-to-nearest threshold.

15. An image processing device as claimed in claim 13, wherein the noise providing portion sets the noise value dependently on a difference between a nearest threshold that corresponds to the nearest relative value and the lower next-to-nearest threshold when the at least one threshold includes the nearest threshold and the lower next-to-nearest threshold.

16. An image processing device as claimed in claim 13, wherein the noise providing portion sets the noise value dependently on a difference between a maximum level among the first predetermined number of first tone levels and the lower next-to-nearest threshold when the nearest relative value is a maximum relative value among the plurality of relative values.

17. An image processing device as claimed in claim 13, wherein the noise providing portion sets the noise value dependently on a difference between a nearest threshold that corresponds to the nearest relative value and the higher next-to-nearest threshold when the at least one threshold includes the nearest threshold and the higher next-to-nearest threshold.

18. An image processing device as claimed in claim 13, wherein the noise providing portion sets the noise value dependently on a difference between a minimum level among the first predetermined number of first tone levels and the higher next-to-nearest threshold when the nearest relative value is a minimum relative value among the plurality of relative values.

19. An image processing device as claimed in claim 13, wherein the noise providing portion sets the noise value to allow the sum of the noise value and the input pixel value to be greater than or equal to the lower next-to-nearest threshold and to be smaller than or equal to the lower next-to-nearest threshold when the at least one threshold includes a nearest threshold that corresponds to the nearest relative value, the lower next-to-nearest threshold, and the higher next-to-nearest threshold.

20. An image processing device as claimed in claim 19, wherein the noise providing portion sets the noise value to allow the sum of the noise value and the input pixel value to be greater than the lower next-to-nearest threshold and to be smaller than the higher next-to-nearest threshold.

21. An image processing device as claimed in claim 20, wherein the noise providing portion sets the noise value dependently on a smaller one of a difference between the nearest threshold and the lower next-to-nearest threshold and another difference between the nearest threshold and the higher next-to-nearest threshold.

22. An image processing device as claimed in claim 20, wherein the noise providing portion sets the noise value to allow a sum of the noise value and the input pixel value to be greater than or equal to a minimum value among the first predetermined number of first tone levels and to be smaller than or equal to a maximum value among the first predetermined number of first tone levels.

23. An image processing device as claimed in claim 20, wherein each of the at least one threshold is substantially equal to a corresponding relative value.

24. An image processing device as claimed in claim 13, wherein the noise providing portion provides the noise to either one of the corrected input value and the at least one threshold when the input pixel value is equal to a false-edge generating pixel value, at which a false edge is generated.

25. An image processing device as claimed in claim 24, wherein the false-edge generating pixel value is equal to either one of at least one relative value among the plurality of relative values and at least one shifted value that is shifted from the at least one relative value by a predetermined amount.

26. An image processing device as claimed in claim 24, wherein the noise providing portion provides the noise to the either one of the corrected input pixel value and the at least one threshold when the input pixel value is within a range that includes the false-edge generating pixel value.

27. An image processing device as claimed in claim 13, wherein a possible maximum value, which an absolute value of the noise value will possibly become, becomes maximum when the input pixel value is equal to the false-edge generating pixel value and decreases as the input pixel value moves away from the false-edge generating pixel value.

28. An image processing method, comprising:
receiving an input pixel value for one pixel, the input pixel value indicating either one of a first predetermined number of different first tone levels, the first predetermined number being greater than or equal to three;
correcting the input pixel value for the pixel based on errors that have been generated at already-processed pixels, thereby determining a corrected input pixel value;
providing a noise to either one of the corrected input pixel value and at least one threshold by executing either one of a noise value adding process and a noise value subtracting process, the noise value adding process adding a noise value to the corrected input pixel value, the noise value subtracting process subtracting the noise value from the at least one threshold;
comparing a noise-value-added corrected input pixel value with the at least one threshold when the corrected input pixel value is added with the noise value and comparing the corrected input pixel value with at least one noise-value-subtracted threshold when the noise value is subtracted from the at least one threshold, thereby outputting an output pixel value based on a compared result, the output pixel value indicating either one of a second predetermined number of different second tone levels, the second predetermined number being smaller than the first predetermined number but being greater than one; and
calculating a difference between the corrected input pixel value and a relative value corresponding to the output pixel value, the relative value being either one of a plurality of relative values that correspond to the second predetermined number of different second tone levels,
the noise providing step providing the noise to the either one of the corrected input pixel value and the at least one threshold when the input pixel value is equal to either one of at least one relative value among the plurality of relative values and at least one adjacent value that is adjacent to the at least one relative value.

29. An image processing method as claimed in claim 28, wherein the noise providing step sets the noise value dependently on the input pixel value.

30. An image processing method as claimed in claim 28, wherein:
the noise providing step sets the noise value dependently on the input pixel value and a lower next threshold when the at least one threshold includes the lower next threshold, the lower next threshold corresponding to a lower next relative value that is lower than and next to the one relative value, and
the noise providing step sets the noise value dependently on the input pixel value and a higher next threshold when the at least one threshold includes the higher next threshold, the higher next threshold corresponding to a higher next relative value that is higher than and next to the one relative value.

31. An image processing method, comprising:
receiving an input pixel value for one pixel, the input pixel value indicating either one of a first predetermined number of different first tone levels, the first predetermined number being greater than or equal to three;
correcting the input pixel value for the pixel based on errors that have been generated at already-processed pixels, thereby determining a corrected input pixel value;
providing a noise to either one of the corrected input pixel value and at least one threshold by executing either one of a noise value adding process and a noise value subtracting process, the noise value adding process adding a noise value to the corrected input pixel value, the noise value subtracting process subtracting the noise value from the at least one threshold;
comparing a noise-value-added corrected input pixel value with the at least one threshold when the corrected input pixel value is added with the noise value and comparing the corrected input pixel value with at least one noise-value-subtracted threshold when the noise value is subtracted from the at least one threshold, thereby outputting an output pixel value based on a compared result, the output pixel value indicating either one of a second predetermined number of different second tone levels, the second predetermined number being smaller than the first predetermined number but being greater than one; and
calculating a difference between the corrected input pixel value and a relative value corresponding to the output pixel value, the relative value being either one of a plurality of relative values that correspond to the second predetermined number of different second tone levels,
the noise providing step providing the noise to the either one of the corrected input pixel value and the at least one threshold when the input pixel value is equal to either one of at least one relative value among the plurality of relative values and at least one shifted value that is shifted from the at least one relative value by a predetermined amount,
the noise providing step setting the noise value to allow a sum of the noise value and the input pixel value to be greater than or equal to a lower next threshold when the at least one threshold includes the lower next threshold, the lower next threshold corresponding to a lower next relative value that is lower than and next to the at least one relative value, and
the noise providing step setting the noise value to allow a sum of the noise value and the input pixel value to be smaller than or equal to a higher next threshold when the at least one threshold includes the higher next threshold, the higher next threshold corresponding to a higher next relative value that is higher than and next to the at least one relative value.

32. An image processing method, comprising:
receiving an input pixel value for one pixel, the input pixel value indicating either one of a first predetermined number of different first tone levels, the first predetermined number being greater than or equal to three;
correcting the input pixel value for the pixel based on errors that have been generated at already-processed pixels, thereby determining a corrected input pixel value;
providing a noise to either one of the corrected input pixel value and at least one threshold by executing either one of a noise value adding process and a noise value subtracting process, the noise value adding process adding a noise value to the corrected input pixel value, the noise value subtracting process subtracting the noise value from the at least one threshold;
comparing a noise-value-added corrected input pixel value with the at least one threshold when the corrected input pixel value is added with the noise value and comparing the corrected input pixel value with at least one noise-value-subtracted threshold when the noise value is subtracted from the at least one threshold, thereby outputting an output pixel value based on a compared result, the output pixel value indicating either one of a second predetermined number of different second tone levels, the second predetermined number being smaller than the first predetermined number but being greater than one; and calculating a difference between the corrected input pixel value and a relative value corresponding to the output pixel value, the relative value being either one of a plurality of relative values that correspond to the second predetermined number of different second tone levels, the noise providing step setting the noise value to allow a sum of the noise value and the input pixel value to be greater than or equal to a lower next-to-nearest threshold when the at least one threshold includes the lower next-to-nearest threshold, the lower next-to-nearest threshold corresponding to a lower next-to-nearest relative value that is lower than and next to a nearest relative value that is the nearest to the input pixel value among the plurality of relative values, and the noise providing step setting the noise value to allow the sum of the noise value and the input pixel value to be smaller than or equal to a higher next-to-nearest threshold when the at least one threshold includes the higher next-to-nearest threshold, the higher next-to-nearest threshold corresponding to a higher next-to-nearest relative value that is higher than and next to the nearest relative.

33. A computer-readable storage medium storing a computer-executable image processing program, the image processing program including:

instructions for receiving an input pixel value for one pixel, the input pixel value indicating either one of a first predetermined number of different first tone levels, the first predetermined number being greater than or equal to three;

instructions for correcting the input pixel value for the pixel based on errors that have been generated at already-processed pixels, thereby determining a corrected input pixel value;

instructions for providing a noise to either one of the corrected input pixel value and at least one threshold by executing either one of a noise value adding process and a noise value subtracting process, the noise value adding process adding a noise value to the corrected input pixel value, the noise value subtracting process subtracting the noise value from the at least one threshold;

instructions for comparing a noise-value-added corrected input pixel value with the at least one threshold when the corrected input pixel value is added with the noise value and comparing the corrected input pixel value with at least one noise-value-subtracted threshold when the noise value is subtracted from the at least one threshold, thereby outputting an output pixel value based on a compared result, the output pixel value indicating either one of a second predetermined number of different second tone levels, the second predetermined number being smaller than the first predetermined number but being greater than one; and instructions for calculating a difference between the corrected input pixel value and a relative value corresponding to the output pixel value, the relative value being either one of a plurality of relative values that correspond to the second predetermined number of different second tone levels, the noise providing instructions providing the noise to the either one of the corrected input pixel value and the at least one threshold when the input pixel value is equal to either one of at least one relative value among the plurality of relative values and at least one adjacent value that is adjacent to the at least one relative value.

34. A computer-readable storage medium as claimed in claim 33, wherein the noise providing instructions set the noise value dependently on the input pixel value.

35. A computer-readable storage medium as claimed in claim 33, wherein:

the noise providing instructions sets the noise value dependently on the input pixel value and a lower next threshold when the at least one threshold includes the lower next threshold, the lower next threshold corresponding to a lower next relative value that is lower than and next to the one relative value, and the noise providing instructions sets the noise value dependently on the input pixel value and a higher next threshold when the at least one threshold includes the higher next threshold, the higher next threshold corresponding to a higher next relative value that is higher than and next to the one relative value.

36. A computer-readable storage medium storing a computer-executable image processing program, the image processing program including:

instructions for receiving an input pixel value for one pixel, the input pixel value indicating either one of a first predetermined number of different first tone levels, the first predetermined number being greater than or equal to three;

instructions for correcting the input pixel value for the pixel based on errors that have been generated at already-processed pixels, thereby determining a corrected input pixel value;

instructions for providing a noise to either one of the corrected input pixel value and at least one threshold by executing either one of a noise value adding process and a noise value subtracting process, the noise value adding process adding a noise value to the corrected input pixel value, the noise value subtracting process subtracting the noise value from the at least one threshold;

instructions for comparing a noise-value-added corrected input pixel value with the at least one threshold when the corrected input pixel value is added with the noise value and comparing the corrected input pixel value with at least one noise-value-subtracted threshold when the noise value is subtracted from the at least one threshold, thereby outputting an output pixel value based on a compared result, the output pixel value indicating either one of a second predetermined number of different second tone levels, the second predetermined number being smaller than the first predetermined number but being greater than one; and instructions for calculating a difference between the corrected input pixel value and a relative value corresponding to the output pixel value, the relative value being either one of a plurality of relative values that correspond to the second predetermined number of different second tone levels, the noise providing instructions providing the noise to the either one of the corrected input pixel value and the at least one threshold when the input pixel value is equal to either one of at least one relative value among the plurality of relative values and at least one shifted value that is shifted from the at least one relative value by a predetermined amount, the noise providing instructions setting the noise value to allow a sum of the noise value and the input pixel value to be greater than or equal to a lower next threshold when the at least one threshold includes the lower next threshold, the lower next threshold corresponding to a lower next relative value that is lower than and next to the at least one relative value, and the noise providing instructions setting the noise value to allow a sum of the noise value and the input pixel value to be smaller than or equal to a higher next threshold when the at least one threshold includes the higher next threshold, the higher next threshold corresponding to a higher next relative value that is higher than and next to the at least one relative value.

37. A computer-readable storage medium storing a computer-executable image processing program, the image processing program including:

instructions for receiving an input pixel value for one pixel, the input pixel value indicating either one of a first predetermined number of different first tone levels, the first predetermined number being greater than or equal to three;

instructions for correcting the input pixel value for the pixel based on errors that have been generated at already-processed pixels, thereby determining a corrected input pixel value;

instructions for providing a noise to either one of the corrected input pixel value and at least one threshold by executing either one of a noise value adding process and a noise value subtracting process, the noise value adding process adding a noise value to the corrected input pixel value, the noise value subtracting process subtracting the noise value from the at least one threshold;

instructions for comparing a noise-value-added corrected input pixel value with the at least one threshold when the corrected input pixel value is added with the noise value and comparing the corrected input pixel value with at least one noise-value-subtracted threshold when the noise value is subtracted from the at least one threshold, thereby outputting an output pixel value based on a compared result, the output pixel value indicating either one of a second predetermined number of different second tone levels, the second predetermined number being smaller than the first predetermined number but being greater than one; and instructions for calculating a difference between the corrected input pixel value and a relative value corresponding to the output pixel value, the relative value being either one of a plurality of relative values that correspond to the second predetermined number of different second tone levels, the noise providing instructions setting the noise value to allow a sum of the noise value and the input pixel value to be greater than or equal to a lower next-to-nearest threshold when the at least one threshold includes the lower next-to-nearest threshold, the lower next-to-nearest threshold corresponding to a lower next-to-nearest relative value that is lower than and next to a nearest relative value that is the nearest to the input pixel value among the plurality of relative values, and the noise providing instructions setting the noise value to allow the sum of the noise value and the input pixel value to be smaller than or equal to a higher next-to-nearest threshold when the at least one threshold includes the higher next-to-nearest threshold, the higher next-to-nearest threshold corresponding to a higher next-to-nearest relative value that is higher than and next to the nearest relative.

* * * * *